United States Patent [19]
Tabata

[11] Patent Number: 5,903,526
[45] Date of Patent: May 11, 1999

[54] MAGNETO-OPTICAL RECORDING MEDIUM HAVING MULTIPLE MAGNETIC LAYERS

[75] Inventor: Masahiro Tabata, Yokohama, Japan

[73] Assignee: Victor Company of Japan, Ltd., Yokohama, Japan

[21] Appl. No.: 08/931,873

[22] Filed: Sep. 17, 1997

[30]    Foreign Application Priority Data

| Sep. 20, 1996 | [JP] | Japan | 8-271918 |
| Sep. 30, 1996 | [JP] | Japan | 8-280399 |
| Jun. 6, 1997 | [JP] | Japan | 9-165019 |

[51] Int. Cl.$^6$ .................................................. G11B 11/00
[52] U.S. Cl. ..................................... 369/13; 428/694 MM
[58] Field of Search ......................... 369/13, 14, 110; 365/122; 360/59, 114; 428/694 ML, 694 MT, 694 RE, 694 MM, 694 EC

[56]    References Cited

U.S. PATENT DOCUMENTS

| 5,629,908 | 5/1997 | Hirokane et al. | 369/13 |
| 5,679,455 | 10/1997 | Nakaki et al. | 369/13 |

FOREIGN PATENT DOCUMENTS

| 0257530 | 3/1988 | European Pat. Off. | 369/13 |
| 0 289 031 | 11/1988 | European Pat. Off. . | |
| 0318925 | 6/1989 | European Pat. Off. | 369/13 |
| 0 352 548 | 1/1990 | European Pat. Off. . | |
| 0 428 128 | 5/1991 | European Pat. Off. . | |
| 0 491 337 | 6/1992 | European Pat. Off. . | |
| 0 513 668 | 11/1992 | European Pat. Off. . | |
| 60-187954 | 9/1985 | Japan . | |
| 62-175948 | 8/1987 | Japan . | |
| 62-293537 | 12/1987 | Japan . | |
| 1-043835 | 2/1989 | Japan . | |
| 5-159389 | 6/1993 | Japan . | |
| 6-215428 | 8/1994 | Japan . | |
| 7-6435 | 1/1995 | Japan . | |

OTHER PUBLICATIONS

Japanese Journal of Applied Physics, 20(11), 2089–2095 Aug. (1981) "Magnetization Process . . . ", T. Kobayashi et al.

J. Appl.Phys., 50(11), 7471–7476 Nov. (1978) "Magnetic and Magneto–Optic Properties . . . " P. Hansen, et al.

IEEE Transactions on Magnetics vol. MAG–16(5), 1188–1193 Sep. (1980) "Magnetic, Magneto–Optic and Switching . . . " M. Urner–Wille, et al.

*Primary Examiner*—Tan Dinh
*Attorney, Agent, or Firm*—Michael N. Meller

[57]    ABSTRACT

Magneto-optic recording medium has at least a 1st magnetic layer for recording information signals, a 2nd magnetic layer formed on the 1st magnetic layer and a 3rd magnetic layer formed on the 2nd magnetic layer. The 1st and 3rd magnetic layers are made of a first amorphous material of rare earth and 3d transition metal having perpendicular magnetic anisotropy in a direction perpendicular to a surface thereof, respectively. The 2nd magnetic layer is interposed between the 1st and 2nd magnetic layers as an intermediate layer. The 2nd magnetic layer is made of a second amorphous material of rare earth metal and 3d transition metal with rare earth metal rich (RE-rich) having a smaller exchange energy between the rare earth metal and a 3d transition metal than that of Gd—Fe or Gd—Fe—Co and having magnetic anisotropy in a direction parallel to a surface of the 2nd magnetic layer, wherein the 1st and the 3rd magnetic layers are magnetically coupled through the 2nd magnetic layer.

12 Claims, 27 Drawing Sheets

MAGNETO-OPTICAL RECORDING MEDIUM HAVING MULTIPLE MAGNETIC LAYERS

BACKGROUND OF THE INVENTION

1. Field of the Invention

The present invention relates to an improvement of a magneto-optic recording medium capable of being written/read by irradiating a laser beam thereon.

2. Description of the Related Art

In a recording method for recording information on a recording medium where information marks (magnetic domain) are read out by utilizing a magneto-optic interaction, the information is recorded on the recording medium as binary information marks in such a manner that first, the recording medium having such a magnetic thin layer as a perpendicular magnetization thin layer is initialized so that a magnetization orientation of the magnetic thin layer is preliminarily aligned in one direction perpendicular to a surface of the magnetic thin layer. Then, magnetic domains corresponding to the information marks are formed to have an magnetization orientation in a reverse direction of the initial magnetization by spot-heating such as irradiation of a laser beam spot with applying the external magnetic field.

In the recording method, before rewriting the information preliminarily recorded on the recording medium, it requires a considerable time to erase (or initialize) the information recorded. As a result, there is a problem that it is impossible to realize a recording of information at a high data transfer rate.

As a countermeasure, in order to save the time of initialization, various kinds of overwriting methods without erasing information are proposed or put into practice.

Among the overwriting methods, there is one so called the light intensity modulation direct overwriting technic, which seems promising as a high density recording technic combined with a magnetic super-resolution technic in future.

As a basic technic of a recording medium to realize this light intensity modulation direct overwriting, there is one proposed in the Japanese Patent Laid-open Publication 62-175948/87.

In the magneto-optic recording method disclosed therein, there is employed a recording medium having a laminated structure of first and second magnetic thin films of rare earth-transition metal. The outline of operation of the magnetic recording is as follows.

A first elevated temperature state by heating the first magnetic thin film up to a temperature T1 higher than Curie temperature Tc of the first magnetic thin film under a first external magnetic field without causing inversion of the sublattice magnetization of the second magnetic thin film; and a second elevated temperature state by heating the second magnetic thin film up to a temperature T2 higher than the temperature T1 and high enough to invert the sublattice magnetization of the second magnetic thin film under the first external magnetic field, which two temperature states are respectively conditioned corresponding to the digital information "0" or "1" to be recorded.

In cooling process, recorded marks (magnetic domains) corresponding to the digital information "0" and "1" are formed on the first magnetic thin layer corresponding to the magnetization orientation of the sublattice of the second magnetic thin layer based on the exchange bonding force between the 1st and 2nd thin layers due to exchange interaction. Then, only the magnetization orientation of the sublattice of the second magnetic thin layer is inverted in one direction at room temperature by applying a second external magnetic field. Thereby, the direct overwrite can be realized.

FIG. 1 is a schematic view for explaining the magnetization states of 1st and 2nd magnetic layers in response to a change of temperature from room temperature to recording temperature upon the recording operation or the rewriting operation.

Next, the description is given of the detailed operation of the magneto-optic recording method in the prior art referred to FIG. 1.

In FIG. 1, a magneto-optic disc (referred to as a "disc") comprises at least a 1st magnetic thin layer as a recording layer, which exhibits high coercivity at room temperature and has low reverse magnetization temperature, and a second magnetic thin layer as a reference layer, which exhibits low coercivity at room temperature and has higher reverse magnetization temperature. Both the layers have perpendicular magnetization. The disc is assumed to be rotated in a certain direction and a laser beam (not shown) is irradiated to provide heat to the 1st and 2nd layers of the disc so as to raise the temperature T1 or T2 corresponding to a low level of digital information or a high level thereof. Further, upon a recording or rewriting operation, an initial external magnetic field Hini and an external recording magnetic field Hex are always applied to the disc in directions as shown with arrows. Thus, the external recording magnetic field Hex is applied to the 1st and 2nd magnetic layers heated at the low temperature T1 or at the high temperature T2 by the laser beam during a rotation of the disc. Thereafter, the initial external magnetic field Hini is applied to the 1st and 2nd magnetic layer cooled down at room temperature during the rotation of the disc.

As initial states, there are two cases, a state A and a state B.

In the state A as the initial state, the 1st magnetic layers is assumed to be magnetized in a direction shown with an arrow "a" in response to a digital signal of a low level "0". The 2nd magnetic layer is magnetized in a direction shown with an arrow "a" as mentioned hereinafter.

In the state B as another initial state, the 1st magnetic layer is magnetized in a direction shown with an arrow "b" in response to a digital signal of a high level "1", and the 2nd magnetic layer is magnetized in the direction "a". It should be noted that the 2nd magnetic layer is always magnetized in the direction shown with the arrow "a" after passing through the initial external magnetic field Hini in the direction of "a".

As an elevated temperature state, there are two cases, a state C corresponding to the lower temperature T1 and a state D corresponding to the higher temperature T2.

In the state C, the magnetization of the 1st magnetic layer vanishes at the lower temperature T1 higher than Curie temperature Tc1 of the 1st magnetic layer by being irradiated with the laser beam, but the 2nd magnetic layer remains in the initial magnetization even when the external recording magnetic field Hex shown with an arrow "b" is applied to the 2nd magnetic layer.

In the state D, the magnetization of the 1st magnetic layer vanishes at the higher temperature T2 which is higher than the lower temperature T1 by being irradiated with the laser beam, and the magnetization orientation of the 2nd magnetic layer is changed to a direction shown with the arrow "b" due to the external recording magnetic field Hex in the direction "b".

As interim states during the rotation of the disc, there are two cases, a state A1 which is changed from the state C and a state E which is changed from the state D. These states A1 and E are realized to be cooled down below Curie temperature Tc1 during the rotation of the disc.

In the state E, the 1st magnetic layer is magnetized in the direction "b" subjected by a magnetic field ("b") of the 2nd magnetic layer in a temperature range lower than the Curie temperature Tc1 of the 1st magnetic layer as the disc is rotated to be cooled down.

Then, as the disc further rotates, the state E is further changed into the state B under the initial magnetic field Hini applied to the 1st and 2nd magnetic layers in the direction "a" at the room temperature, wherein the magnetization orientation of the 2nd magnetic layer is changed corresponding to the direction "a" of the initial magnetic field Hini though the magnetization orientation "b" of the 1st magnetic layer remains as it is.

In the state A1, the 1st magnetic layer is magnetized in the direction "a" subjected by a magnetic field ("a") of the 2nd magnetic layer in a temperature range lower than the Curie temperature Tc1 of the 1st magnetic layer as the disc is rotated to be cooled down.

Then, as the disc further rotates, the initial magnetic field Hini is also applied thereto, however, the magnetization orientation thereof is the same as that of the 2nd magnetic layer. Thus, the state A is the same as the state A1.

As well known, when the 1st and 2nd magnetic layers are facing to each other and they are magnetized in an opposite direction to each other as shown in the state B at the room temperature, an interface magnetic domain wall (referred to as interface wall hereinafter) is formed on an interface therebetween because of an exchange coupling force.

The interface wall energy σw is represented as follows:

$$H_{w\ i} = \sigma_w / 2M_{si}h_i \quad (1)$$

Wherein, $H_{w\ i}$: the effective bias magnetic field received by an ith magnetic layer and caused by another magnetic layer adjacent to the ith magnetic layer, $M_{si}$: the saturation magnetization of the ith magnetic layer, $h_i$: the thickness of the ith magnetic layer.

$$\sigma_w = 2\{(A_1 \times K_1)^{1/2} + (A_2 \times K_2)^{1/2}\} \quad (2)$$

Wherein, $A_1$: the exchange stiffness constant of the 1st magnetic layer, $A_2$: the exchange stiffness constant of the 2nd magnetic layer, $K_1$: the effective magnetic anisotropy constant of the 1st magnetic layer, $K_2$: the effective magnetic anisotropy constant of the 1st magnetic layer, As the condition of the overwriting, it is necessary to meet the following conditions so as to prevent the transition from the state A to the state B at room temperature.

$$H_{c1} > H_{w\ 1} = \sigma_w / 2M_{s1}h_1 \quad (3)$$

Wherein, $H_{c1}$: the coercivity of the 1st magnetic layer, $H_{w\ 1}$: the effective bias magnetic field received by the 1st magnetic layer and caused by the adjacent magnetic layer of the 1st magnetic layer, $M_{s1}$: the saturation magnetization of the 1st magnetic layer, $h_1$: the thickness of the 1st magnetic layer.

Further, to prevent the transition from the state B to the state E at room temperature, it is necessary to meet the following condition.

$$H_{c2} > H_{w\ 2} = \sigma_w / 2M_{s2}h_2 \quad (4)$$

Wherein, $H_{c2}$: the coercivity of the 2nd magnetic layer, $H_{w\ 2}$: the effective bias magnetic field received by the 2nd magnetic layer and caused by an magnetic layer adjacent to the 2nd magnetic layer, $M_{s2}$: the saturation magnetization of the 2nd magnetic layer, $h_2$: the thickness of the 2nd magnetic layer.

Further, in the state E, to prevent the polarity inversion of the 1st magnetic layer by the initial magnetic field Hini for initialization, it is necessary to meet the following condition.

$$H_{c1} \pm H_{107\ 1} > H_{ini} \quad (5)$$

Here, as to the positive and negative signs "±" of the left side, the positive sign "+" is employed when the 1st magnetic layer is made of a rare earth metal rich (referred to as RE-rich) layer and the 2nd magnetic layer is made of a transition metal rich (referred to as TM-rich) layer, or an opposite case to the above, i.e., in the case of an antiparallel coupling. The negative sign "−" is employed when both the 1st and 2nd magnetic layers are made of the RE-rich layers, or the TM-rich layers, i.e., in the case of parallel coupling.

On the other hand, it is necessary to meet the following condition so as to allow the transition from the state E to the state B.

$$H_{c2} + H_{w\ 2} < H_{ini} \quad (6)$$

Further, to allow the transition from the state C to the state A at about the Curie temperature Tc1 of the 1st magnetic layer, i.e., to allow the magnetization orientation of the 1st magnetic layer to be arranged in the magnetization orientation of the 2nd magnetic layer, it is necessary to meet the following condition.

$$H_{w\ 1} > H_{c1} + H_{ex} \quad (7)$$

Wherein, Hex: the external recording magnetic field.

As seen from the above description, in order to satisfy the formula (3) and (4) at the room temperature, the interface wall energy σw is desirable to be smaller.

At the temperature where the magnetization orientation of the 1st magnetic layer is arranged in the magnetization direction of the 2nd magnetic layer, the interface wall energy σw needed to be maintained at a state that the amount of the interface wall energy σw is not changed or less changed if any, under a condition satisfying the formula (7).

However, it was impossible to realize all the states mentioned above by only controlling the coercivity values, the saturation magnetization values and the thicknesses of the 1st and 2nd magnetic layers.

In the magneto-optic readout method, the magnetic reversal portion corresponding to an information bit, which forms a magnetic domain, is read out based on magnetic Kerr effect. Thus, in order to improve the recording density, it is necessary to decrease a length of a recorded information bit, i.e., to diminish an area of the magnetic domain.

However, as well known, a reproduction resolution of signal is practically determined by a wavelength λ of a light source and a numerical aperture of an objective lens used in an optical pickup system, and its limitation of the readout is determined by $2NA/\lambda$.

Thus, in order to increase the recording density, it is considered to decrease the wavelength $\lambda$ of the light source and/or to employ an objective lens having a high numerical aperture NA to allow a diameter of a laser spot to be diminished. However, a wavelength of the laser beam in a practical use is only 680 nm. Further, when the objective lens having the high numerical aperture NA is employed, a focal length thereof becomes short. This requires a high precision distance control between the lens and an optical disc, resulting in a severe precision of the optical disc in production.

Accordingly, it is impossible to employ such an objective lens having the high numerical aperture NA. The numerical aperture NA of the objective lens to be practically used is at most 0.6. In other words, there is a limitation to improve the recording density by using the wavelength $\lambda$ of the light source and the numerical aperture NA of the objective lens.

As a countermeasure for solving the problem in improving the recording density restricted by such readout conditions, there are proposed a method for readout signals and a detected medium used for the same, for instance, in Japanese Patent Laid-open Publication 6-150418/1994.

In this readout method, the exchange interaction between a readout layer (first magnetic layer) and a recording layer (second magnetic layer) is utilized in such a manner that the information magnetic domain recorded on the recording layer is copied to the readout layer, and the information is detected from the readout layer.

The structure of such a recording medium is as follows.

The magneto-optic recording medium comprises a transparent substrate, a readout layer (a first magnetic layer) formed on the transparent substrate and a recording layer (a second magnetic layer) formed on the readout layer. The readout layer behaves the in-plane magnetization parallel to the surface thereof at room temperature. However, as the temperature rises, the in-plane magnetization of the readout layer is changed into the perpendicular magnetization. The recording layer has a function to magneto-optically record information thereon. The recording layer is made of a rare earth-transition metal alloy.

The information is recorded on the magneto-optic recording medium as follows.

Under a constant magnetic field applied to the medium to allow the recording layer to be magnetized, a magnetization orientation of the recording layer is reversed by being irradiated with a laser beam in such a manner that the power of the laser beam is selectively set to either a first laser power which is relatively lower laser power, or a second laser power which is relatively higher laser power responsive to the recording signals.

The information recorded on the recording layer is reproduced as follows.

When the laser beam is irradiated on the medium, there is generated a gradient of temperature in the diameter range of the laser beam spot on the readout layer. The readout layer which shows the in-plane magnetization at the room temperature, turns to the perpendicular magnetization in an area corresponding to a high temperature area in the gradient of temperature, and the orientation of the perpendicular magnetization is arranged in the direction parallel to the magnetization of the recording layer. Thereby, the information is read out.

However, the material forming the readout layer in the magneto-optic recording medium mentioned in the foregoing has a wide temperature range for allowing the magnetization transition from the in-plane to the perpendicular magnetization. This wide temperature range causes a problem that it is inadequate to read out information with a high S/N (C/N) from the area information magnetic domain of the recording layer smaller than an area corresponding to the diameter of the laser beam spot irradiated on the readout layer.

On the other hand, according to the present invention, as the material forming the readout layer (the first magnetic layer), there is employed an alloy having a small exchange energy between the rare earth metal and the 3d transition metal. Thereby, it is possible to reduce the temperature range for allowing the magnetization transition from the in-plane to the perpendicular magnetization, resulting in realizing the magnetically induced super resolution readout for the high density recorded information recorded on the area information magnetic domain of the recording layer smaller than the area corresponding to the diameter of the laser beam spot with excellent S/N (C/N) compared with ordinary ones.

SUMMARY OF THE INVENTION

Accordingly, a general object of the present invention is to provide a magneto-optic recording medium, in which the above disadvantages have been eliminated.

A specific object of the present invention is to provide a magneto-optic recording medium having at least a 1st magnetic layer for recording information signals, a 2nd magnetic layer formed on the 1st magnetic layer and a 3rd magnetic layer formed on the 2nd magnetic layer, the magneto-optic recording medium comprising: the 1st and 3rd magnetic layers each being made of a first amorphous material of rare earth and 3d transition metal having perpendicular magnetic anisotropy in a direction perpendicular to a surface thereof, respectively; and the 2nd magnetic layer interposed between the 1st and 3rd magnetic layers as an intermediate layer, the 2nd magnetic layer being made of a second amorphous material of a rare earth metal and a 3d transition metal with rare earth metal rich (RE-rich), the second amorphous material having a smaller exchange energy between the rare earth metal and the 3d transition metal than that of one selected from a group of Gd—Fe and Gd—Fe—Co and having in-plane magnetic anisotropy in a direction parallel to a surface of the 2nd magnetic layer, wherein the 1st and the 3rd magnetic layers are magnetically coupled through the 2nd magnetic layer.

Another and more specific object of the present invention is to provide a magneto-optic recording medium comprising: a first magnetic layer formed on a transparent substrate for reading information recorded on a second magnetic layer, the first magnetic layer having an easy axis of magnetization in a direction parallel to a surface thereof at a room temperature, the easy axis of magnetization being changed into a perpendicular direction from the in-plane direction when heated up to a predetermined temperature higher than the room temperature, the first magnetic layer being made of a rare earth and a 3d transition metal in which an exchange energy between the rare earth metal and the 3d transition metal is made to be small, and a second magnetic layer provided on the first layer for magneto-optically recording information and transferring the information to the first magnetic layer for reading out the information, the second magnetic layer being made of a rare earth 3d transition metal alloy having an easy axis of magnetization in a direction perpendicular a surface thereof at a room temperature.

Other objects and further features of the present invention will be apparent from the following detailed description.

DETAILED DESCRIPTION OF THE PREFERRED EMBODIMENT

Figure 1:
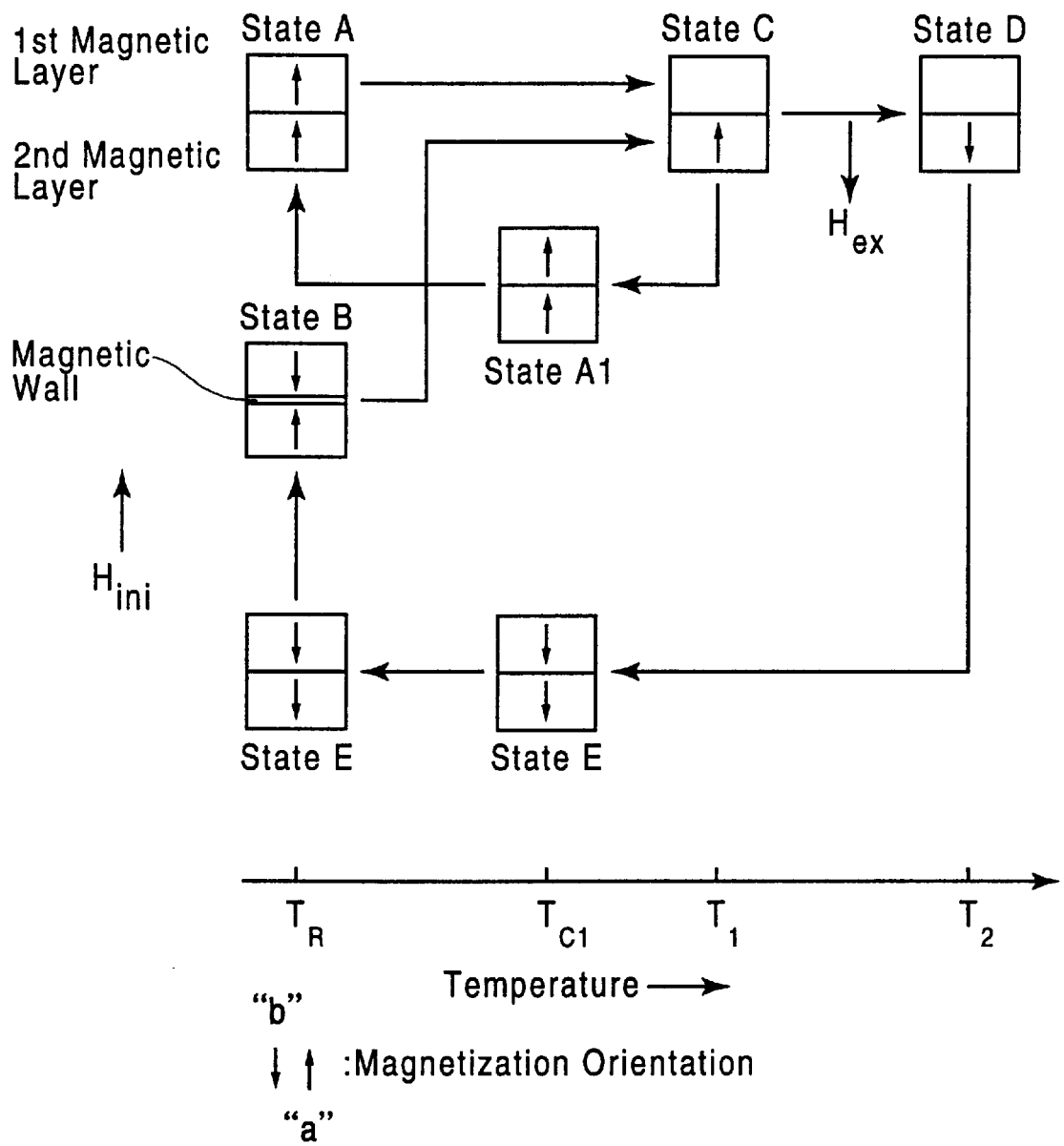
FIG. 1 is a schematic view for explaining the magnetization states of 1st and 2nd magnetic magnetic layers varied in response to a change of temperature from a room temperature to a recording temperature upon the recording operation or the rewriting operation.

Description is now given of first to third embodiments of magneto-optic recording mediums according to the present invention referring to FIGS. 2 to 16, wherein the like reference characters as shown in FIG. 1 denote like or corresponding parts throughout the drawings, and detailed descriptions of the like parts are omitted for simplicity except for new parts employed.

[First embodiment of a magneto-optic recording medium]

Figure 2:
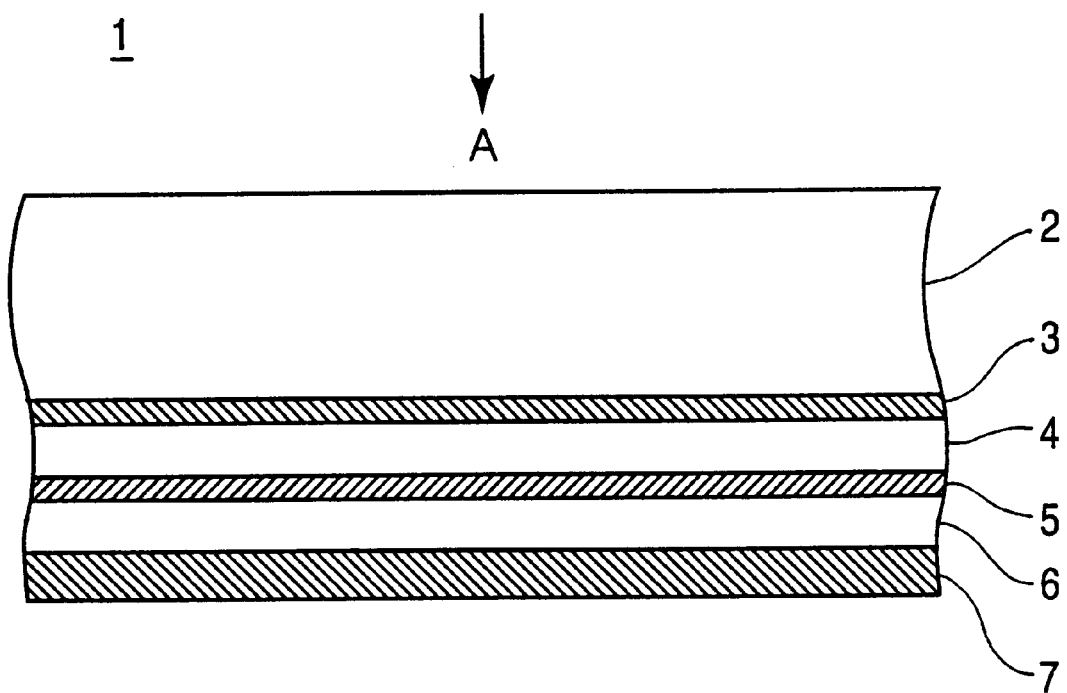
FIG. 2 is a sectional view for explaining a structure of a magneto-optic recording medium of the present invention.

FIG. 2 is a sectional view for explaining a structure of a magneto-optic recording medium of the present invention.

Referring to FIG. 2, a magneto-optic recording medium 1 of the present invention comprises a transparent base 2 made of a glass plate or a polycarbonate plate, a dielectric layer 3 as a protection layer or a multiple interference layer provided on the transparent base 2, 1st, the thin films of 2nd and 3rd magnetic layers (referred to as magnetic layer) 4, 5, 6, which are stacked in this order by using sputtering method, and a protection layer 7 made of a non-magnetic metal or a dielectric layer provided on the 3rd magnetic layer 6.

The laser beam is irradiated from an upper surface of the transparent base 2 as shown with an arrow A.

Each of the 1st and 3rd magnetic layers 4, 6 is composed of an amorphous magnetic layer of a rare earth-3d transition metal having a perpendicular magnetic anisotropy, wherein the 1st magnetic layer 4 has a function as the recording layer and the 3rd layer 6 has a function of the reference layer as mentioned in the foregoing.

The 2nd magnetic layer 5 as an intermediate layer interposed between the first and third magnetic layers 4, 6 is made of a rare earth-3d transition metal layer in which the rare earth metal is rich compared to the 3d transition metal (referred to as RE-rich layer hereinafter). The 2nd magnetic layer 5 of the RE-rich of the present invention is constructed to have a small exchange energy between the rare earth metal and the transition metal. The effective reduction of the exchange energy therebetween can be attained, for instance, by adding other metals such as Bi and Sn to the 2nd magnetic layer as mentioned hereinafter. Further, the 2nd magnetic layer 5 has in-plane magnetic anisotropy in the direction parallel to the surface of the 2nd magnetic layer 5.

Specifically, the 1st magnetic layer 4 is made of, for instance, Tb—Fe (terbium-iron alloy), or Tb—Fe—Co (terbiumiron-cobalt alloy). The 3rd magnetic layer 6 is made of, for instance, Dy—Fe—Co (dysprosium-iron-cobalt alloy).

The 2nd magnetic layer 5 as the intermediate layer is made of the RE(rare earth metal)-rich layer, for instance, Gd—Fe (gadolinum-iron alloy) or Gd—Fe—Co (gadolinum-iron-cobalt alloy).

Specifically, in a composition formula represented by $Gd_x(Fe_{1-y}—Co_y)_{1-x}$, "x" and "y" denote an atom containing ratio, respectively, and are defined as follows:

$0.32 \leq x \leq 0.50$, $0 \leq y \leq 0.3$ (x and y denote an atom containing ratio, respectively).

Further, other metals such as Bi (bismuth) and Sn (tin) are added to the Gd—Fe—Co to reduce the exchange energy between the rare earth metal and 3d transition metal.

Next, a description is given of an important feature of the temperature dependence of the interface wall energy developed between the 1st and 3rd magnetic layers and effective control method of the interface wall energy. Here, the 2nd magnetic layer 5 of the present invention is provided as an intermediate layer interposed between the 1st and 3rd magnetic layers 4, 6 so as to control the exchange coupling force between the 1st and 3rd magnetic layers 4, 6.

Figure 3:
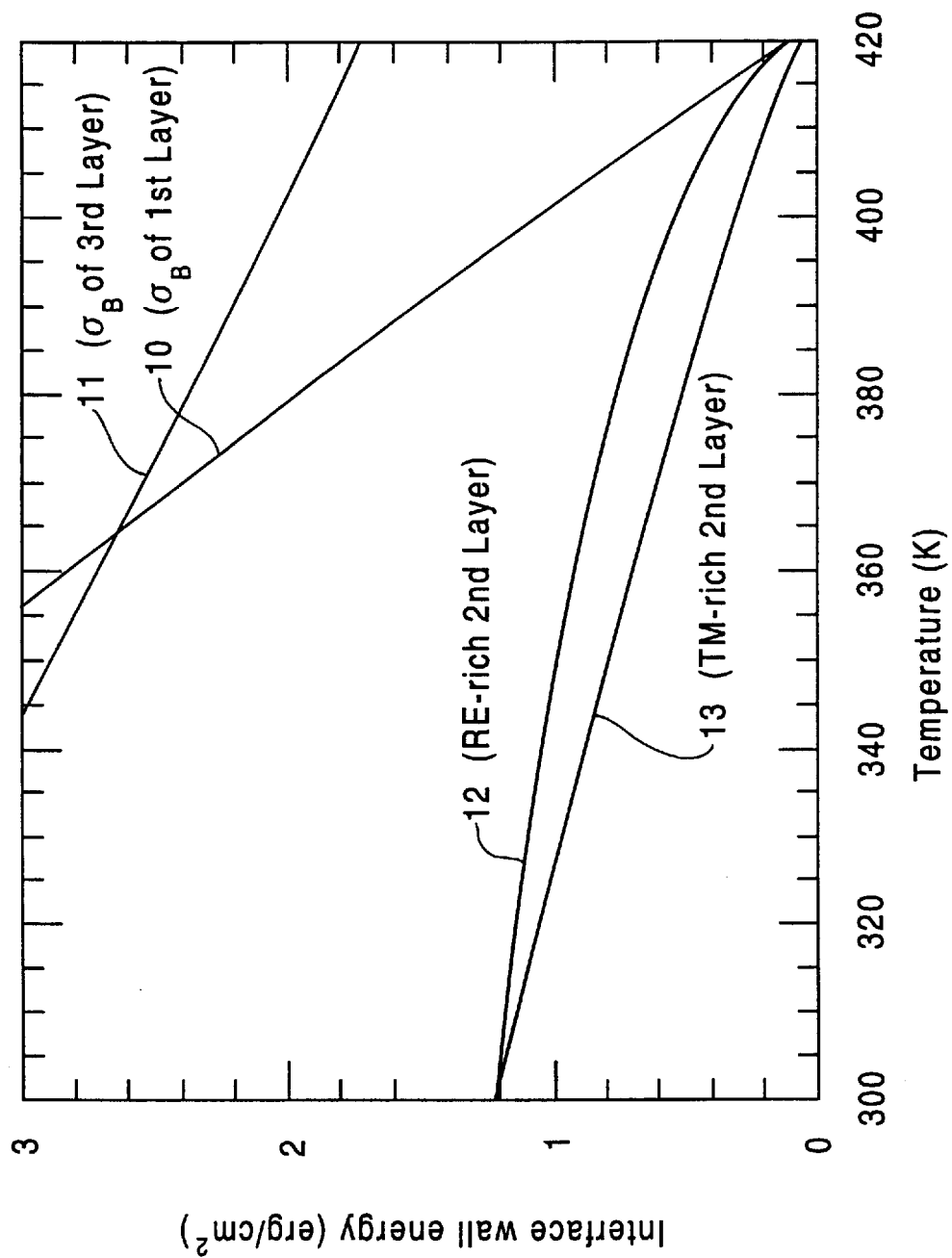
FIG. 3 is a graph showing temperature dependence of interface wall energy (σw) developed between 1st and 3rd magnetic layers with respect to either case where a RE-rich layer or a TM-rich layer is employed as a 2nd magnetic layer in the magneto-optic recording medium, respectively, and temperature dependence of Bloch wall energy (σw) of both the 1st and 3nd magnetic layers.

FIG. 3 is a graph showing temperature dependence of interface wall energy ($\sigma w$) developed between 1st and 3rd magnetic layers with respect to either case where a RE-rich layer or a TM (3rd transition metal)-rich layer is employed as a 2nd magnetic layer in the magneto-optic recording medium, and temperature dependence of Bloch wall energy ($\sigma B$) of both the 1st and 3nd magnetic layer.

The values of interface wall energy and Bloch wall energy are calculated on the basis of a molecular field theory by using parameters determined from the experimental values of magnetization temperature characteristics and effective magnetic anisotropy energy ($Ku-2\pi Ms^2$) vs temperature characteristics with respect to each of the magnetic layers (1st to 3rd magnetic layers) used in the magneto-optic recording medium. The effective magnetic anisotropy energy ($Ku-2\pi Ms^2$) is represented as a difference between the intrinsic magnetic anisotropy energy Ku and the demagnetizing field energy $2\pi Ms^2$ (Ms: saturation magnetization).

In FIG. 3, an ordinate represents the interface wall energy ($erg/cm^2$) or the Bloch wall energy ($erg/cm^2$), and an abscissa represents absolute temperature (K) (referred to as temperature). Further, in FIG. 3, reference numerals 10, 11 denote the temperature dependence curves of Bloch wall energy $\sigma B$ developed in the 1st and 3rd magnetic layers 4, 6, respectively, and 12, 13 temperature dependence curves of the interface wall energy developed between the 1st and 3rd magnetic layers 4, 6 when either of the RE-rich and TM-rich layers is employed as the 2nd magnetic layer 5.

As seen from the formulas (3), (4), (5) and (6) mentioned in the foregoing, the interface wall energy developed between the 1st and 3rd magnetic layer is desirable to be smaller at the room temperature. Thus, as shown in the curves 12, 13 in FIG. 3, the interface wall energy between the 1st and 3rd magnetic layers 4, 6 is respectively made to be as small as 1.2 $erg/cm^2$ at the room temperature in either case employing the RE-rich or the TM-rich layer as the 2nd magnetic layer 5.

As seen from FIG. 3, as the temperature rises, the interface wall energy therebetween is gradually decreased in either case, however, a decrement rate of the curve 12 is smaller than that of the curve 13. This fact means that the curve 12 is more preferable than the curve 13 as mentioned hereinafter.

Figure 4:
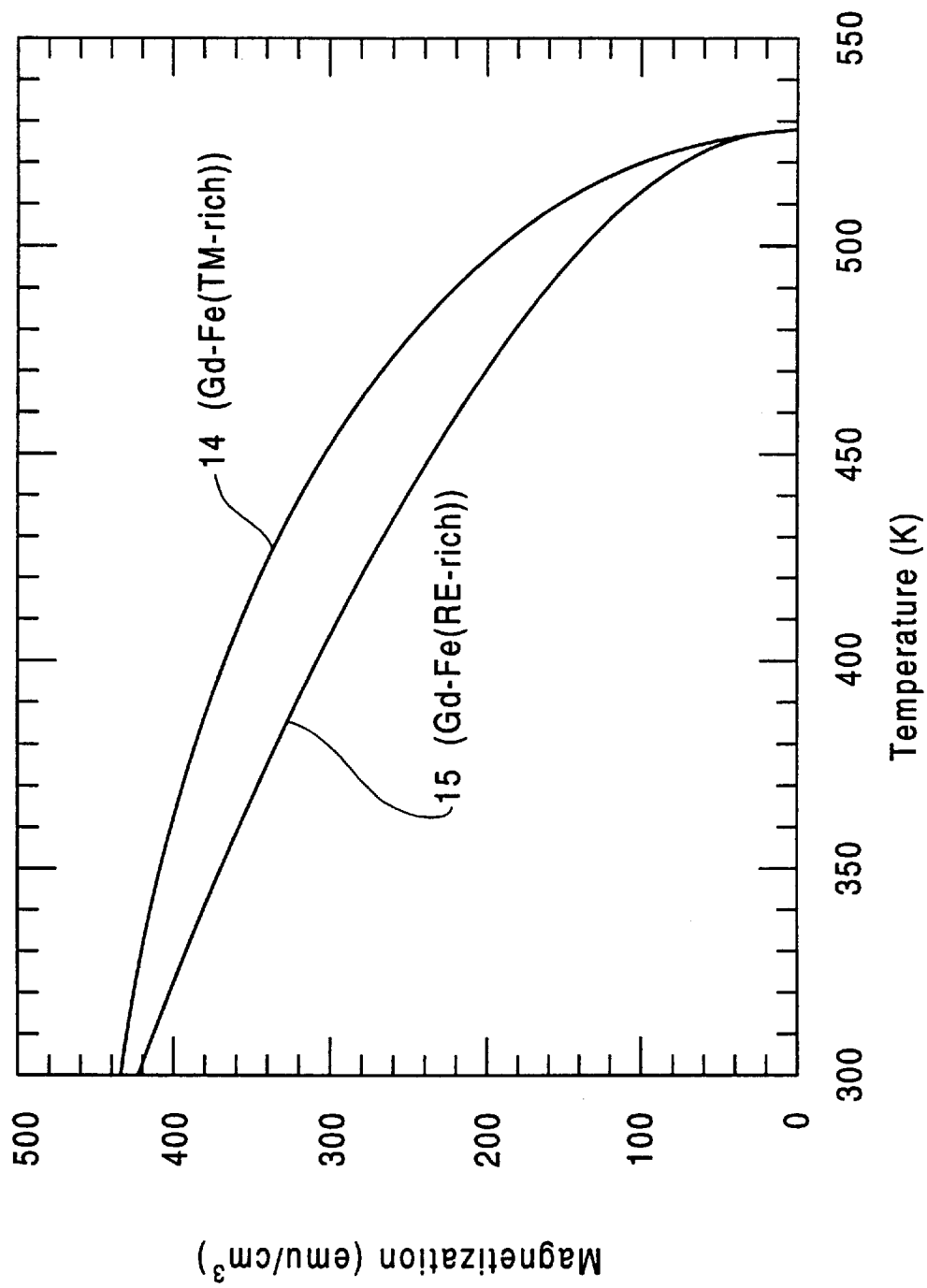
FIG. 4 is a graph showing temperature dependence of magnetization of the RE-rich layer of Gd—Fe and the TM-rich layer of Gd—Fe when either is used as the 2nd magnetic layer in the magneto-optic recording medium.

FIG. 4 is a graph showing temperature dependence of magnetization of the RE-rich layer of Gd—Fe and the TM-rich layer of Gd—Fe either of which is used as the 2nd magnetic layer in the magneto-optic recording medium.

In FIG. 4, an ordinate represents magnetization ($emu/cm^3$) and an abscissa represents temperature (K), and a reference character 14 denotes a temperature dependence curve of magnetization of the TM-rich layer of Gd—Fe and, 15 the magnetization vs temperature characteristic curve of the RE-rich of Gd—Fe.

Figure 5:
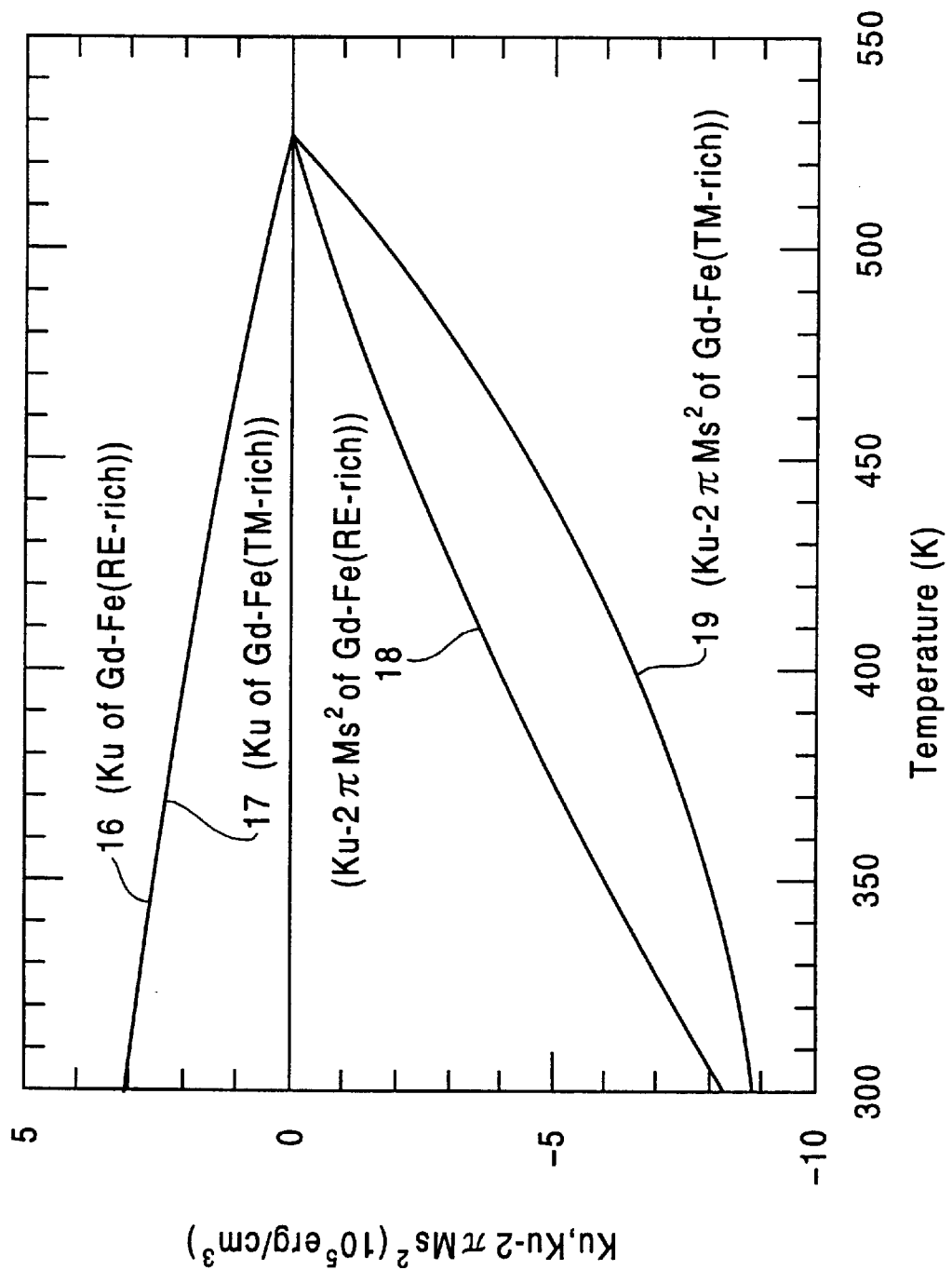
FIG. 5 is a graph showing temperature dependence of the intrinsic magnetic anisotropy energy (Ku) and of the effective magnetic anisotropy energy (Ku—$2\pi Ms^2$) with respect to the RE-rich layer of Gd—Fe and TM-rich layer of Gd—Fe when either is used as the 2nd magnetic layer in the magneto-optic recording medium.

FIG. 5 is a graph showing temperature dependence of the intrinsic magnetic anisotropy energy (Ku) and of the effective magnetic anisotropy energy ($Ku-2\pi Ms^2$) with respect to the RE-rich layer of Gd—Fe and TM-rich layer of Gd—Fe either which is used as the 2nd magnetic layer in the magneto-optic recording medium.

In FIG. 5, an ordinate represents the intrinsic magnetic anisotropy energy Ku ($10^5$ $erg/cm^3$) or the effective magnetic anisotropy energy $Ku-2\pi Ms^2$($10^5$ $erg/cm^3$) and an abscissa represents temperature (K), and reference characters 16, 17 respectively denote a temperature dependence curve of the intrinsic magnetic anisotropy energy (Ku) of the RE-rich layer of Gd—Fe and that of the TM-rich layer of Gd—Fe, and 18, 19 a temperature dependence curve of the effective magnetic anisotropy energy (Ku−2πMs$^2$) of the RE-rich layer of Gd—Fe and that of the TM-rich layer of Gd—Fe.

Next, a description is given of a reason why the curve 12 shown in FIG. 3 is preferable compared with the curve 13 shown therein, referring to FIG. 3.

As mentioned in the foregoing, from a viewpoint of the magnetic copy performance from the 3rd magnetic layer 6 to the 1st magnetic layer 4, it is preferable that as the temperature rises, a decrement rate of the interface wall energy between the 1st and 3rd magnetic layer 4, 6 is lessened. This fact is understood from the formula (7) taking account of formula (1), i.e., a formula (7') derived therefrom as follows.

$$Hw1 = \sigma w / 2M_s h_i > Hc1 + Hex \qquad (7')$$

wherein a symbol σw denotes the interface wall energy between the 1st and 3rd magnetic layers 4, 6.

As seen from the formula (b 7'), it is desirable that the value of σw is larger than the room temperature.

Referring to FIG. 3, when comparing the curves 12 with the curve 13, the curve 12 is more slowly decreased than the curve 13, as the temperature rises.

Accordingly, it can be said that when employing the RE-rich layer as the 2nd magnetic layer 5 it is possible to perform a better magnetic copy from the 3rd magnetic layer 6 to the 1st magnetic layer 4 than when employing the TM-rich layer as the 2nd magnetic layer 5.

Further, as shown as the curves 18, 19 in FIG. 5, as the temperature rises, the effective magnetic anisotropy energy Ku−2πMs$^2$ of the RE-rich of Gd—Fe (curve 18) employed as the 2nd layer 5 rapidly increases compared with that of the TM-rich layer of Gd—Fe (curve 19) (It should be noted that the curve 19 of the TM-rich layer of Gd—Fe droops downward).

Taking account of a fact that an interface wall energy is generally expressed as a sum of the effective magnetic anisotropy energy and the exchange energy, it is said that a difference of the effective magnetic anisotropy energy between the RE-rich layer and the TM-rich layer responsive to a change of the temperature causes the difference of the interface wall energy between the two cases employing the RE-rich layer or the TM-rich layer as the 2nd magnetic layer 5, which is shown in FIG. 3.

Further, referring to the curves 14, 15 shown in FIG. 4, as the temperature rises, the magnetization of the RE-rich layer of Ge—Fe is largely decreased compared with that of the TM-rich layer of Gd—Fe. (It should be noted that the curve 14 of the TM-rich layer swells upward). Thus, It can be said that as shown in FIG. 3, this difference of magnetization between the RE-rich layer and the TM-rich layer causes the difference of the interface wall energy between the two cases where the TM-rich layer or the RE-rich layer is employed as the 2nd magnetic layer 5, because, as seen from the temperature dependence curves 16, 17, 18 and 19 in FIG. 5, the intrinsic magnetic anisotropy energy (Ku) of the RE-rich layer (the curve 16) is changed at the same rate as that (the curve 17) of the TM-rich layer responsive to the change of the temperature, but the effective magnetic anisotropy energy (Ku−2πMs$^2$) of the RE-rich layer (the curve 18) is differently changed from that of the TM-rich layer (the curve 19) responsive to the change of temperature.

Taking account of the fact that an interface wall energy is expressed as a sum of effective magnetic anisotropy energy and exchange energy, and the effective magnetic anisotropy energy (Ku−2πMs$^2$) is related to the demagnetizing field energy due to the saturation magnetization Ms as mentioned in the foregoing, the difference of magnetization between the RE-rich layer and the TM-rich layer responsive to the change of temperature causes the difference of the interface wall energy between the two cases where the RE-rich or TM-rich layers is employed as the 2nd magnetic layer 5.

In other words, the temperature dependence curve 15 of the RE-rich layer shown in FIG. 4 is more preferable than the curve 14 of the TM-rich layer when they are employed as the 2nd magnetic layer 5, i.e., the magnetization of the 2nd magnetic layer 5 is more desirable to be decreased as the temperature rises.

Figure 6:
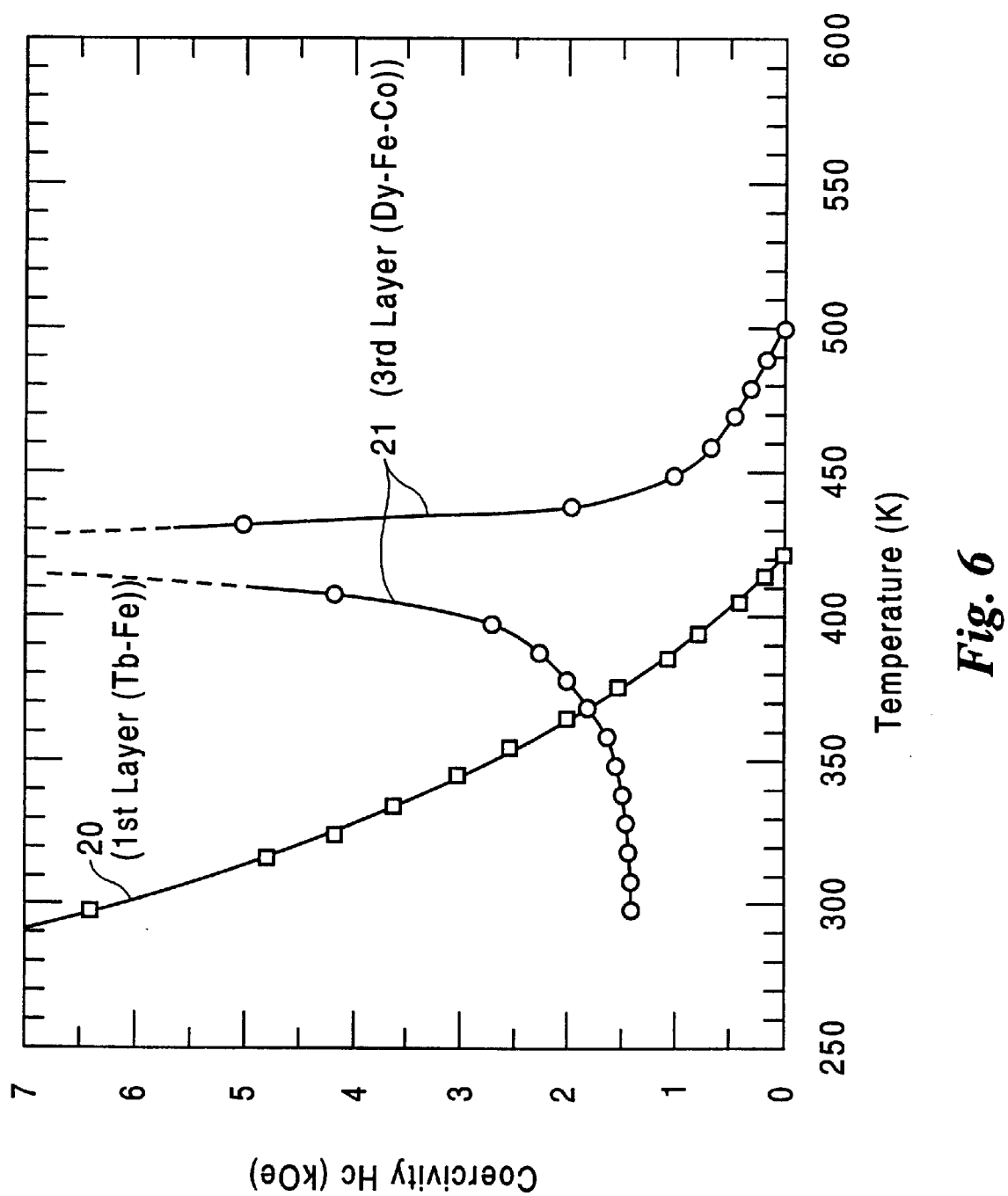
FIG. 6 is a graph showing coercivity Hc vs temperature characteristics of the 1st magnetic layer of Tb—Fe and the 3rd magnetic layer of Dy—Fe—Co employed in the magneto-optic recording medium.

FIG. 6 is a graph showing coercivity Hc vs temperature characteristics of the 1st magnetic layer of Tb—Fe and the 3rd magnetic layer of Dy—Fe—Co either of which is employed in the magneto-optic recording medium.

In FIG. 6, the ordinate represents coercivity Hc (kOe) and the abscissa represents temperature (K). Reference number 20 denotes the coercivity vs temperature characteristic curve of the 1st magnetic layer 4 of Tb—Fe and 21 that of the 3rd magnetic layer 6 of Dy—Fe—Co layer.

As seen from a comparison between the curves 20, 21 in FIG. 6, a temperature range capable of the magnetic copy from the 3rd magnetic layer 6 of Dy—Fe—Co to the 1st magnetic layer 4 of Tb—Fe is from 370K to 420K, wherein the coercivity Hc of the 3rd magnetic layer 6 is larger than that of the 1st magnetic layer 4 for the corresponding temperature.

Figure 7:
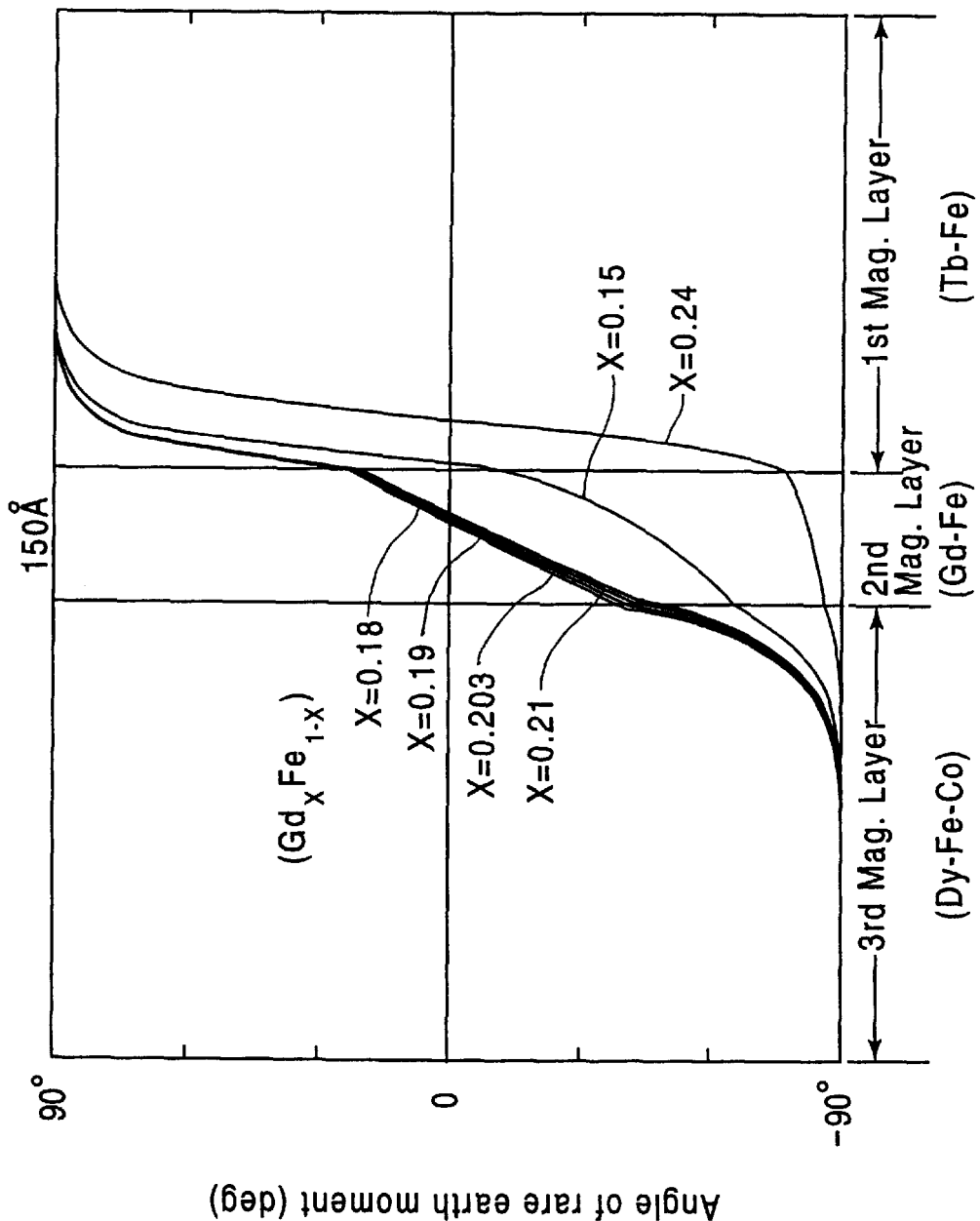
FIG. 7 is a graph showing the inversion state of the RE magnetic moment of the magneto-optic recording medium with respect to Gd composition x in a composition notation of (Gd$x$—Fe1-$x$) when a TM-rich layer of Gd—Fe is used as the 2nd magnetic layer.
Figure 8:
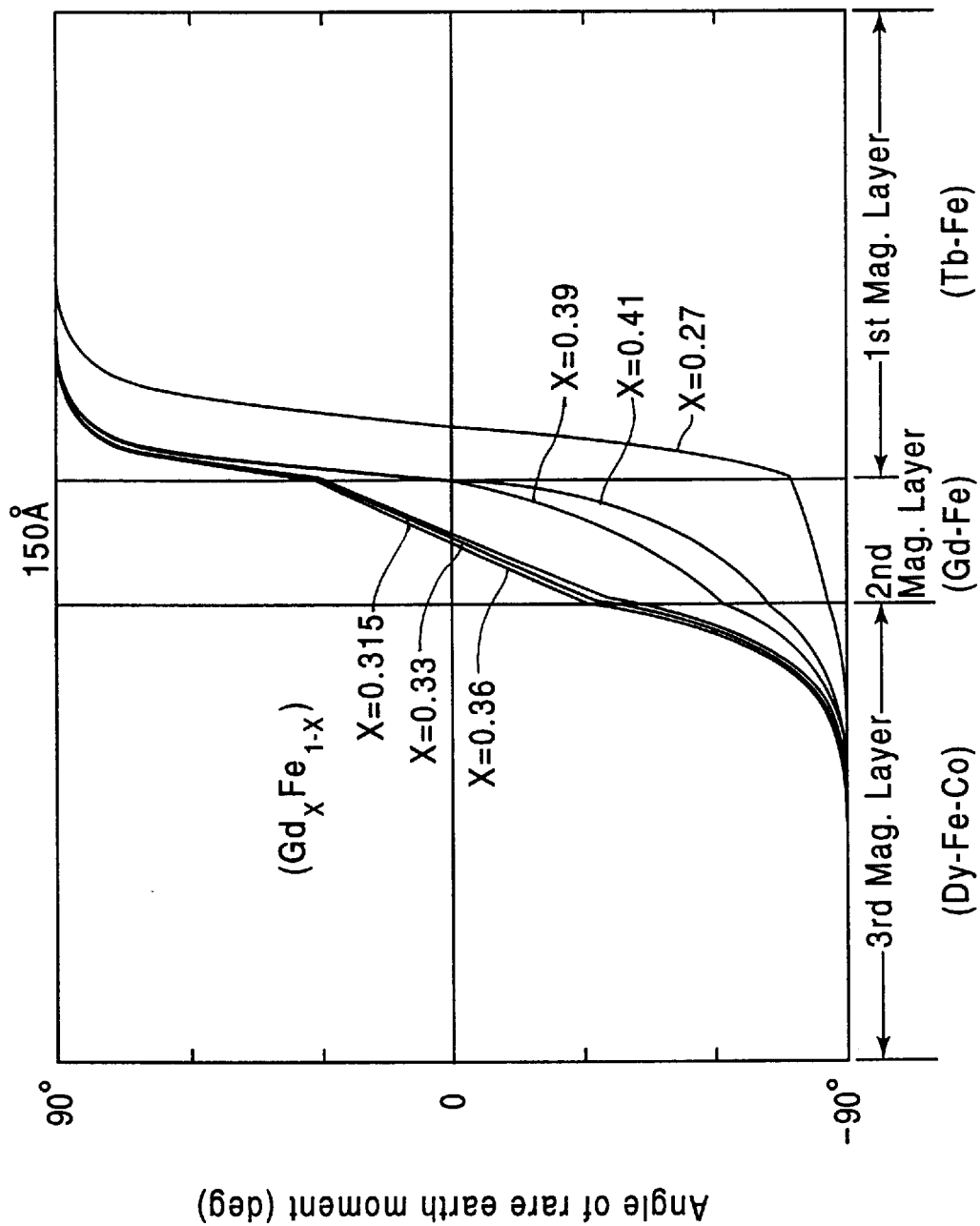
FIG. 8 is a graph showing the inversion state of the sublattice magnetization of the magneto-optic recording medium with respect to Gd composition in the composition notation of (Gd$x$ Fe1-$x$) when an RE-rich layer of Gd—Fe is used as the 2nd magnetic layer.

In order to discuss the stability of the interface wall within the temperature range mentioned above, the angle of the RE magnetic moment from the film plane as a function of the thickness direction in the magneto-optic recording medium 1 having the 1st, 2nd and 3rd magnetic layers 4, 5, 6 are shown in FIGS. 7 and 8.

FIG. 7 is a graph showing the angle of the RE magnetic moment from the film plane as a function of the thickness direction in the magneto-optic recording medium with respect to Gd composition x in a composition notation of (Gd$_x$—Fe$_{1-x}$) when a TM-rich layer of Gd—Fe is used as the 2nd magnetic layer.

In FIG. 7, the ordinate represents the angle of the rare earth moment from the film plane and the abscissa represents the thicknesses of the 1st, 2nd and 3rd magnetic layers 4, 5, 6.

Specifically, the 1st magnetic layer 4 is made of Tb—Fe, the 2nd magnetic layer 5 is made of a TM-rich layer of Gd—Fe and the 3rd magnetic layer 6 is made of Dy—Fe—Co. The thickness of the 2nd magnetic layer 5 of Gd—Fe is made to be 150 angstrom.

Further, in each curve of X=0.15, X=0.18, X=0.19, X=0.203, X=0.21 and X=0.24, X denotes an atom containing ratio of Gd atom in the composition notation of (Gd$_x$Fe$_{1-x}$) in the TM-rich layer of Gd—Fe employed as the 2nd magnetic layer 5.

FIG. 8 is a graph showing the angle of RE magnetic moment in the magneto-optic recording medium with respect to Gd composition in the composition notation of (Gd$_x$ Fe$_{1-x}$) when an RE-rich layer of Gd—Fe is used as the 2nd magnetic layer.

In FIG. 8, the ordinate represents the angle of the of rare earth moment from the film plane and the abscissa represents the thicknesses of the 1st, 2nd and 3rd magnetic layers 4, 5, 6 as mentioned in the foregoing.

In each curve of X=0.27, X=0.315, X=0.33, X=0.36, X=0.39 and X=0.41, X denotes an atom containing ratio of Gd atom in the composition notation of $(Gd_x Fe_{1-x})$ in the RE-rich layer of Gd—Fe employed as the 2nd magnetic layer 5.

In FIGS. 7 and 8, the angle of the RE magnetic moment is defined such that the magnetic moment orientation parallel to the film plane is made to be zero, and a certain magnetization orientation perpendicular to the film plane is made to be +90° and an opposite orientation is made to be −90°. It is considered that most of the interface wall is present in the second magnetic layer 5 in a stable state because a main magnetic moment inversion is generated in the 2nd magnetic layer 5.

Referring to FIG. 7, in the magneto-optic recording medium 1 employing the 2nd magnetic layer 5 having the Gd atom containing ratio of 24 at % (X=0.24) of the 2nd magnetic layer 5, the center of the interface wall is considered to shifted to the 1st magnetic layer 4 from the 2nd magnetic layer 5.

Similarly, as seen from FIG. 8, in the magneto-optic recording medium 1 employing the 2nd magnetic layer 5 having the Gd atom containing ratio of 27 at % (X=0.27) of the 2nd magnetic layer 5, the center of the interface wall is shifted to the 1st magnetic layer from the 2nd magnetic layer 5.

Figure 9:
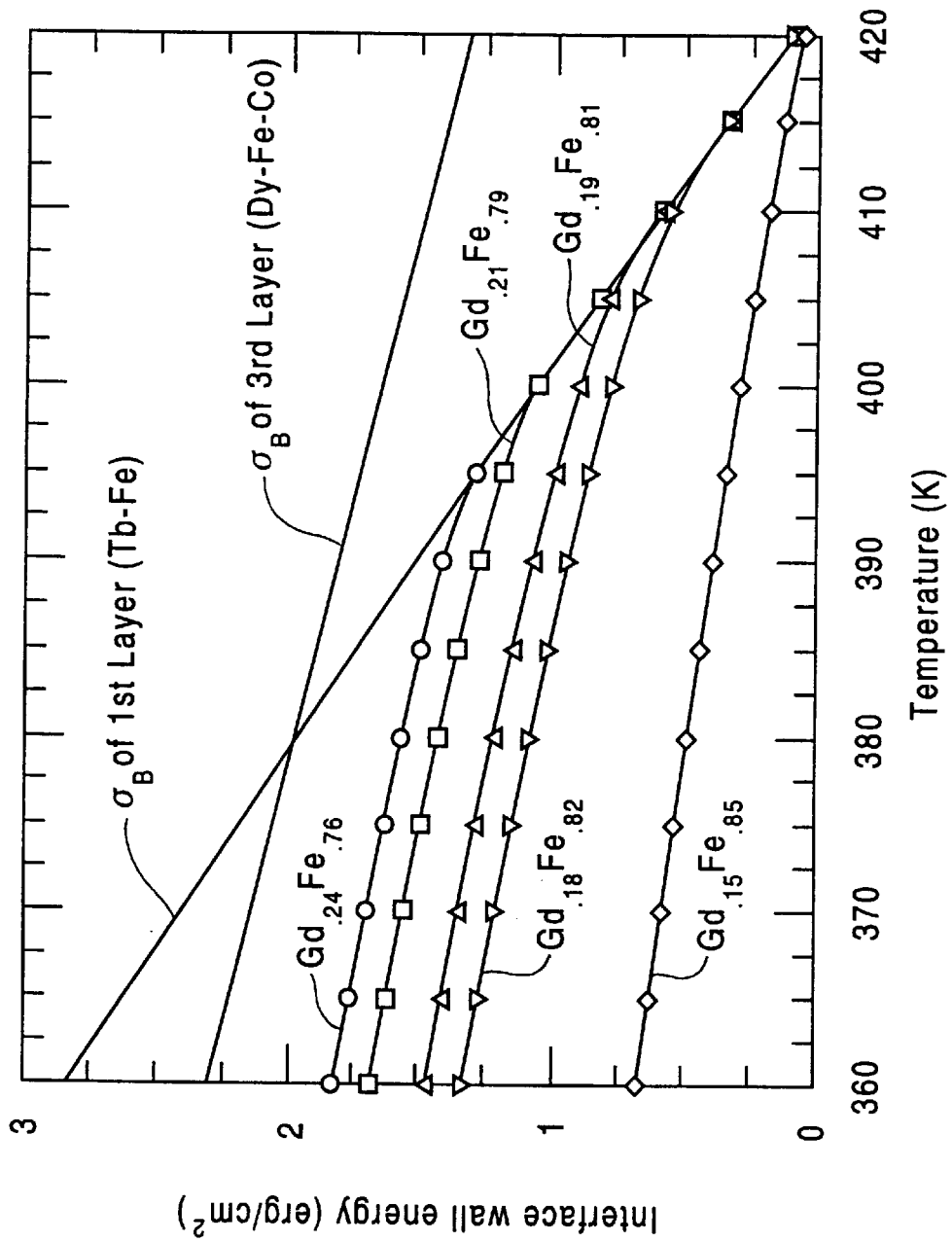
FIG. 9 is a graph showing the temperature dependence of the interface wall energy between the 1st magnetic layer of Tb—Fe layer and the 3rd magnetic layer of Dy—Fe—Co when the TM-rich layer of Gd—Fe is employed as the 2nd magnetic layer in the magneto-optic recording medium, wherein an atomic containing ratio X of Gd atom in the composition notation of the (Gd$x$Fe$x$-1) in the 2nd magnetic layer is varied.

FIG. 9 is a graph showing temperature dependence of the interface wall energy between the 1st magnetic layer of Tb—Fe layer and the 3rd magnetic layer of Dy—Fe—Co when the TM-rich layer of Gd—Fe is employed as the 2nd magnetic layer in the magneto-optic recording medium, wherein an atomic containing ratio X of Gd atom in the composition notation of the (Gd$x$Fe$x$−1) in the 2nd magnetic layer is varied.

In the curve of $Gd_{0.15}Fe_{085}$ shown in FIG. 9, ($Gd_{0.15}Fe_{0.25}$) denotes x=0.15 (atomic containing ratio of Gd) in the (Gd$x$Fe1−$x$) formula in the Gd—Fe layer (TM-rich) employed as the 2nd magnetic layer 5.

Similarly, ($Gd_{0.18}Fe_{0.82}$) denotes x=0.18, ($Gd_{0.19}Fe_{0.81}$) x=0.19, ($Gd_{0.21}Fe_{0.79}$)x=0.21, and ($Gd_{0.24}Fe_{0.76}$)x=0.24.

Figure 10:
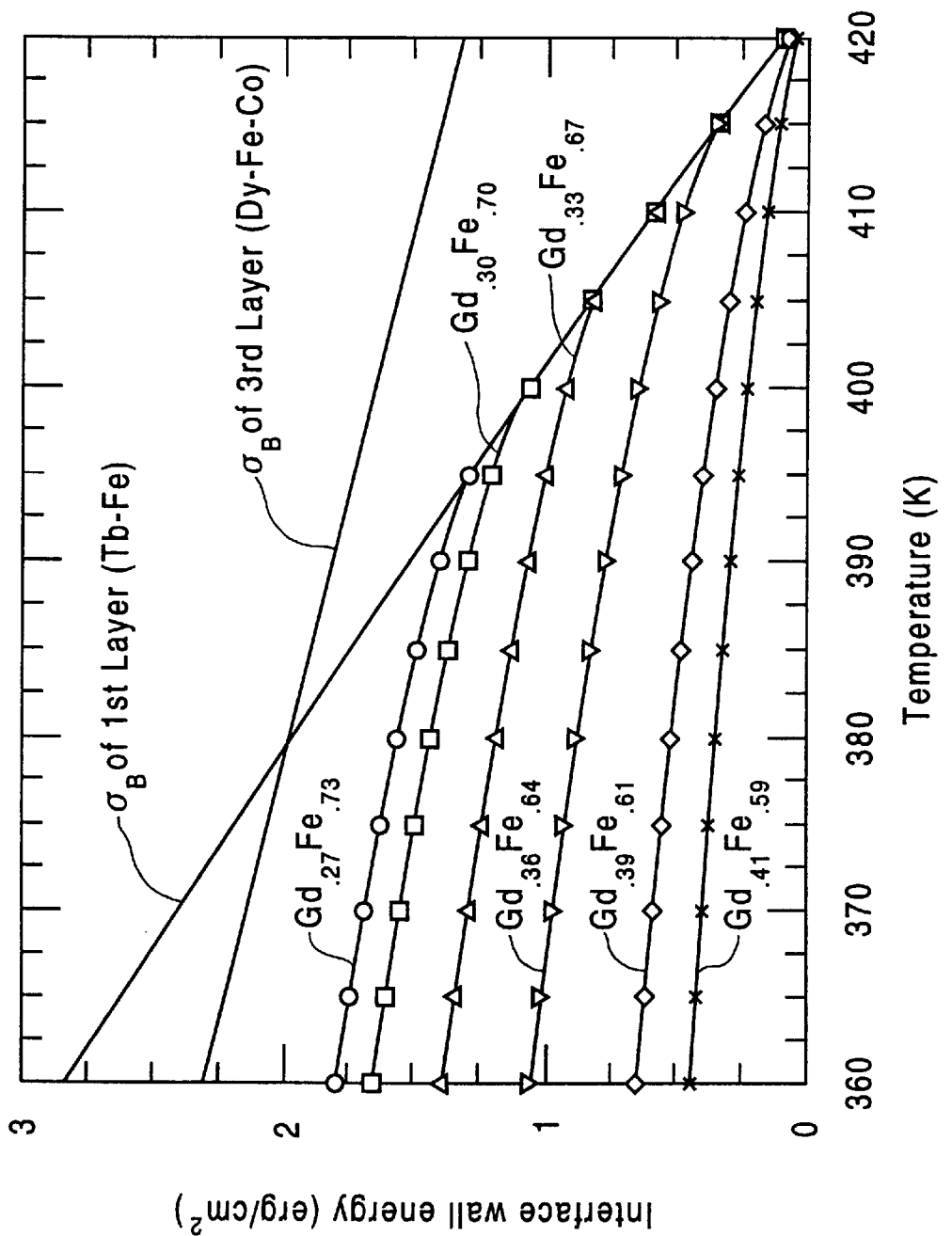
FIG. 10 is a graph showing the temperature dependence of the interface wall energy between the 1st magnetic layer of Tb—Fe layer and the 3rd magnetic layer of Dy—Fe—Co when the RE-rich layer of Gd—Fe is employed as the 2nd magnetic layer in the magneto-optic recording medium, wherein an atomic containing ratio X of Gd atom in the composition notation of the (Gd$x$Fe$x$-1) in the 2nd magnetic layer is varied.

FIG. 10 is a graph showing the temperature dependence of the interface wall energy between the 1st magnetic layer of Tb—Fe layer and the 3rd magnetic layer of Dy—Fe—Co when the RE-rich layer of Gd—Fe is employed as the 2nd magnetic layer in the magneto-optic recording medium, wherein an atomic containing ratio X of Gd atom in the composition notation of the (Gd$x$Fe$x$−1) in the 2nd magnetic layer is varied.

In the curve of $Gd_{0.27}Fe_{0.73}$ shown in FIG. 10, ($Gd_{0.27}Fe_{0.73}$) denotes x=0.27 (atomic containing ratio of Gd) in the (Gd$x$Fe1−$x$) formula in the Gd—Fe layer (RE-rich) employed as the 2nd magnetic layer 5.

Similarly, ($Gd_{0.30}Fe_{0.70}$) denotes x=0.30, ($Gd_{0.33}Fe_{0.67}$) x=0.33, ($Gd_{0.36}Fe_{0.64}$) x=0.36, ($Gd_{0.39}Fe_{0.61}$) x=0.39 and ($Gd_{0.41}Fe_{0.59}$) x=0.41, respectively.

As seen from FIGS. 9 and 10, in the magneto-optic recording medium 1, two kinds of mediums, each having the 2nd magnetic layer 5 of Gd atom containing ratio of x=0.24 or x=0.27, have an interface wall energy equivalent to an Bloch wall energy σB of the 1st magnetic layer 4 at the temperature of 395K.

Specifically, as shown in FIG. 9, the interface wall energy of the 2nd magnetic layer 5 having a Gd composition of ($Gd_{0.24}Fe_{0.76}$) coincides with the Bloch wall energy of the 1st magnetic layer 4 at the temperature of 395K.

Further, as shown in FIG. 10, the interface wall energy of the 2nd magnetic layer 5 having a Gd composition of ($Gd_{0.27}Fe_{0.73}$) coincides with the Bloch wall energy σB of the 1st magnetic layer 4 at the temperature of 395K.

As a result, it is considered that in the magneto-optic recording medium 1 employing the 2nd magnetic layer 5 having the composition of ($Gd_{0.24}Fe_{0.76}$) or ($Gd_{0.27}Fe_{0.73}$) nearly equivalent to the compensation composition of the 2nd magnetic layer 5, the interface wall energy thereof is considered to permeate into the 1st magnetic layer 4, resulting in that the center of the wall is shifted to the 1st magnetic layer 4 from the second magnetic layer 5.

As mentioned in the foregoing, the interface wall energy σw can be represented by the formula (2).

$$\sigma w = 2\{(A_1 K_1)^{1/2} + (A_2 K_2)\}^{1/2} \quad (2)$$

Wherein,
$A_1$: the exchange stiffness constant of the 1st magnetic layer,
$A_2$: the exchange stiffness constant of the 3rd magnetic layer,
$K_1$: the effective magnetic anisotropy constant of the 1st magnetic layer,
$K_2$: the effective magnetic anisotropy constant of the 3rd magnetic layer.

Thus, the interface magnetic wall is considered to be shifted to a side where a product of the A and the K is smaller.

Accordingly, it is possible to make the interface wall stable by reducing the perpendicular magnetic anisotropy energy of the 2nd magnetic layer 5.

Figure 11:
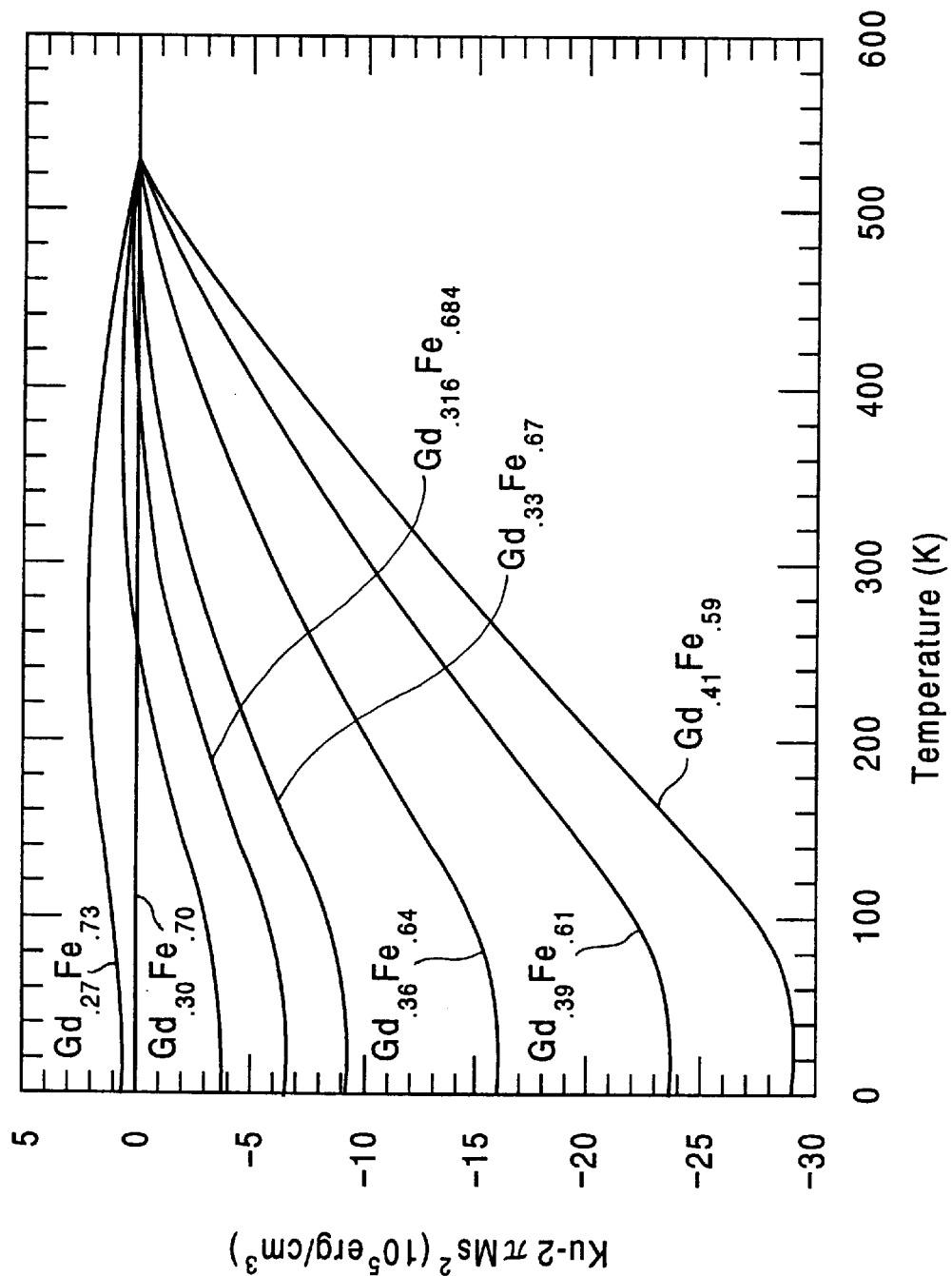
FIG. 11 is a graph showing the effective magnetic anisotropy energy vs temperature characteristics with respect to Gd components of the Gd—Fe layers (RE-rich) employed as the 2nd magnetic layer.

FIG. 11 is a graph showing the effective magnetic anisotropy energy vs temperature characteristics with respect to Gd—Fe components of the Gd—Fe layers (RE-rich) employed as the 2nd magnetic layer.

In the curve of $Gd_{0.27}Fe_{0.73}$ shown in FIG. 11, ($Gd_{0.27}Fe_{0.73}$) denotes x=0.27 (atomic containing ratio of Gd) in the composition notation of ($Gd_x Fe_{1-x}$) in the Gd—Fe layer (RE-rich) employed as the 2nd magnetic layer 5.

Similarly, the curve of ($Gd_{0.30}Fe_{0.70}$) denotes x=0.30, ($Gd_{0.316}Fe_{0.684}$) x=0.316, ($Gd_{0.3}Fe_{0.7}$) x=0.3, ($Gd_{0.36}Fe_{0.64}$) x=0.36, ($Gd_{0.39}Fe_{0.61}$) x=0.39 and ($Gd_{0.41}Fe_{0.59}$) x=0.41, respectively.

As seen from FIG. 11, a composition range where the effective anisotropy energy of the 2nd magnetic layer 5 becomes negative in the temperature range of 370K to 420K capable of magnetic copy, i.e., a composition range where the the 2nd magnetic layer 5 has the in-plane magnetic anisotropy, is more than 32 at % of Gd in the composition of the 2nd magnetic layer 5. In this composition range of Gd, most of the interface wall is present in a stable state in the 2nd magnetic layer 5.

As mentioned above, in the magneto-optic recording medium 1 comprising the 1st and 3rd magnetic layers of amorphous rare earth-3d transition metal having a perpendicular magnetic anisotropy and the 2nd magnetic layer interposed between the 1st and 3rd magnetic layers, the first and the third magnetic layers are magnetically coupled through the 2nd magnetic layer being laminated, and the 2nd magnetic layer provided for controlling the coupling of the 1st and 3rd magnetic layer is made of a amorphous rare earth-3d transition metal of the RE-rich in which an exchange energy between the rare earth metal and the 3d transition metal is smaller than that of the TR-rich, and the 2nd magnetic layer has an in-plane magnetic anisotropy in a direction parallel to the surface thereof at least at temperature of more than 100° C. These features contributes to improve the read-write characteristics of the magneto-optic recording medium.

[Second embodiment]

As mentioned in the first embodiment, the interface wall energy vs temperature is largely affected by the magnetization vs temperature characteristics of the intermediate layer as the 2nd magnetic layer 5.

Therefore, the interface wall energy vs temperature characteristics can be improved by controlling the temperature dependence of the saturation magnetization of the intermediate layer.

Specifically, it is effective to control the exchange energy between the rare earth metal and the 3d transition metal, i.e., the exchange energy between Gd atom and Fe atom in the intermediate layer of Gd—Fe.

For instance, when such elements as Bi and Sn are added to the GdFe intermediate layer, the compensation temperature of the GdFe layer is reduced, resulting from a reduction of the exchange energy between Gd and Fe atoms.

Figure 12:
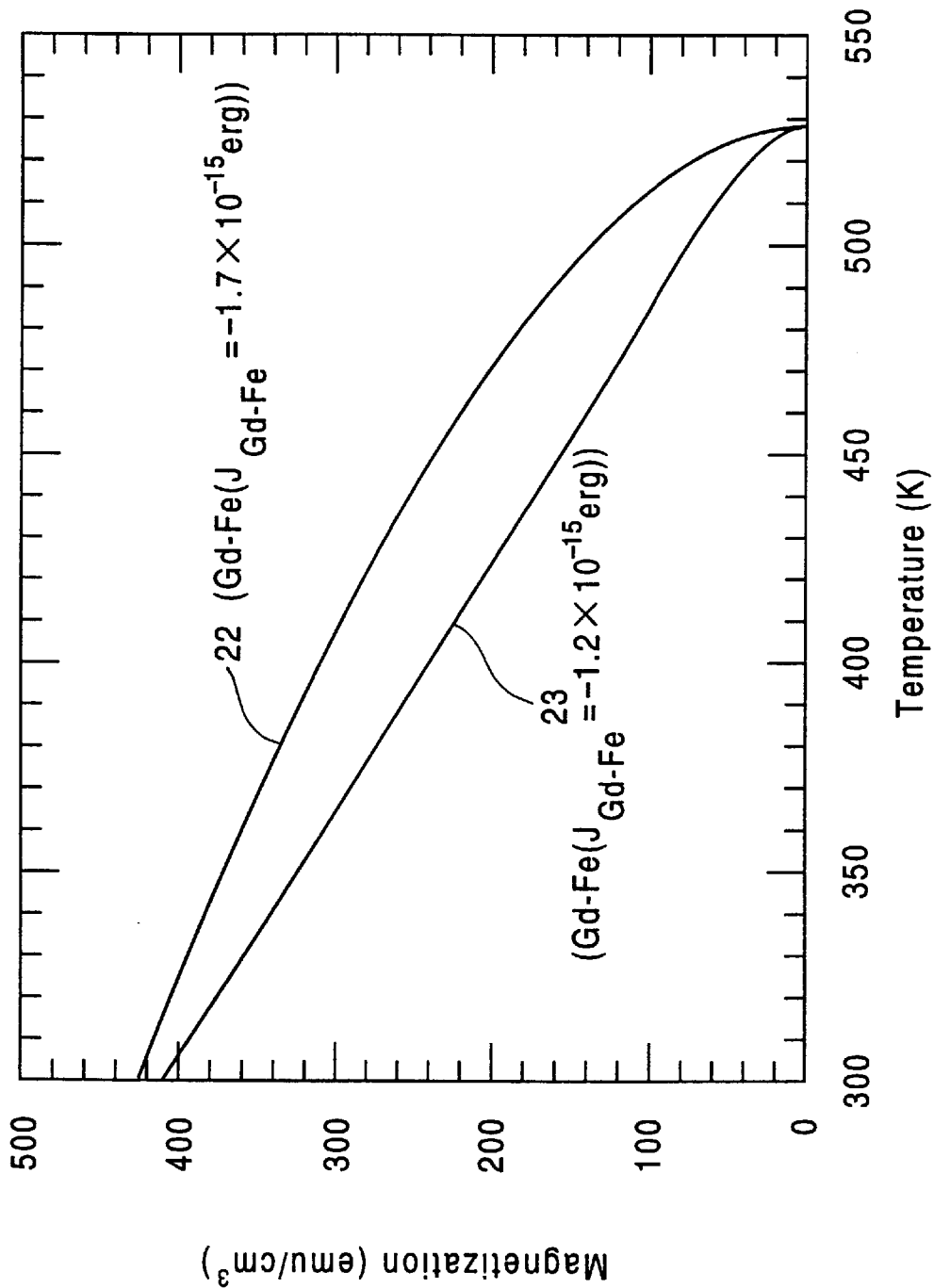
FIG. 12 is a graph showing magnetization vs temperature characteristic of the Gd—Fe layers with respect to the RE-rich layer and the RE-rich layer of which exchange energy between Gd atom and Fe atom is reduced employed as the 2nd magnetic layer.

FIG. 12 is a graph showing magnetization vs temperature characteristic of the Gd—Fe layers with respect to the RE-rich and the RE-rich layer of which exchange energy between Gd atom and Fe atom is reduced employed as the 2nd magnetic layer.

In FIG. 12, a reference numeral 22 designates a magnetization vs temperature characteristic curve of the Gd—Fe layer (RE-rich) having the exchange energy $J_{GdFe}$ of $-1.7 \times 10^{-15}$ erg between Gd and Fe atoms, and 23 a magnetization vs temperature characteristic curve of the Gd—Fe layer (RE-rich) having the exchange energy $J_{GdFe}$ of $-1.2 \times 10^{-15}$ erg between Gd and Fe atoms.

Figure 13:
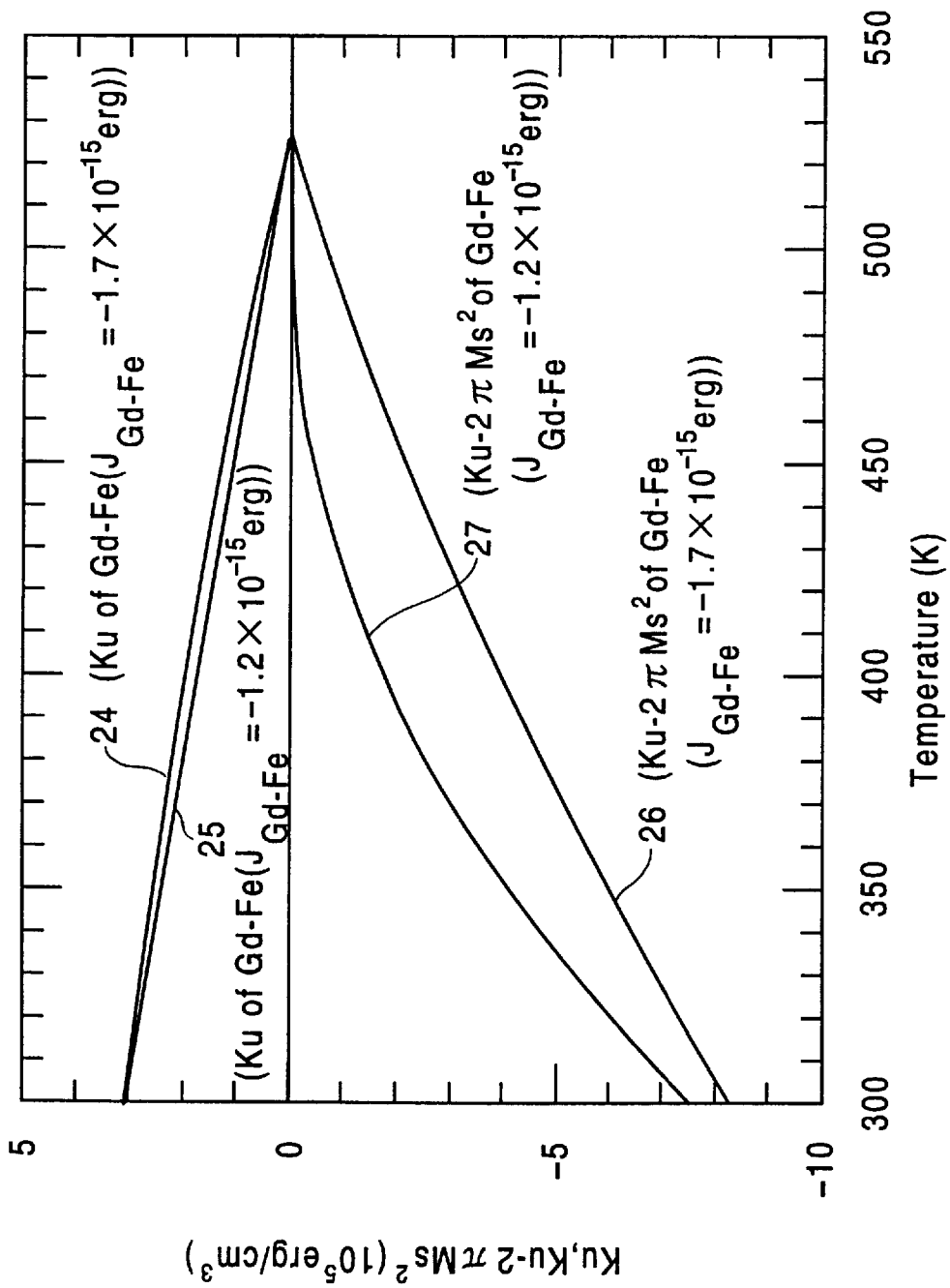
FIG. 13 is a graph showing the intrinsic magnetic anisotropy energy (Ku) and effective magnetic anisotropy energy (Ku—$2\pi Ms^2$) vs temperature characteristics of the GdFe layers with respect to the RE-rich layer and the RE-rich layer of which exchange energy between Gd atom and Fe atom is reduced, which Gd—Fe layers are used as the 2nd magnetic layer in the magneto-optic recording medium 1.

FIG. 13 is a graph showing the intrinsic magnetic anisotropy energy (Ku) and effective magnetic anisotropy energy (Ku−2πMs$^2$) vs temperature characteristics of the Gd—Fe layers with respect to the RE-rich layer and the RE-rich layer of which exchange energy between Gd atom and Fe atom is reduced, either of which Gd—Fe layers is used as the 2nd magnetic layer in the magneto-optic recording medium 1.

In FIG. 13, the ordinate represents the intrinsic magnetic anisotropy energy Ku ($10^5$ erg/cm$^3$) or the effective magnetic anisotropy energy Ku−2πMs$^2$ ($10^5$ erg/cm$^3$) and the abscissa represents the temperature (K). Reference character 24 denotes an intrinsic magnetic anisotropy energy (Ku) vs temperature characteristic curve of the Gd—Fe layers (RE-rich) having exchange energy $J_{GdFe}$ of $-1.7 \times 10^{-15}$ erg between Gd atom and Fe atom, 25 an intrinsic magnetic anisotropy energy (Ku) vs temperature characteristic curve of the Gd—Fe layers (RE-rich) having exchange energy $J_{GdFe}$ of $-1.2 \times 10^{-15}$ erg between Gd and Fe atoms, 26 an effective magnetic anisotropy energy (Ku−2πMs$^2$) vs temperature characteristic curve of the Gd—Fe layers (RE-rich) having exchange energy $J_{GdFe}$ of $-1.7 \times 10^{-15}$ erg between Gd atom and Fe atom, and 27 an effective magnetic anisotropy energy (Ku−2πMs$^2$) vs temperature characteristic curve of the Gd—Fe layers (RE-rich) having exchange energy $J_{GdFe}$ of $-1.2 \times 10^{-15}$ erg between Gd and Fe atoms.

As seen from comparison between the curve 22 (exchange energy $J_{GdFe}$ of $-1.7 \times 10^{-15}$ erg) and the curve 23 (exchange energy $J_{GdFe}$ of $-1.2 \times 10_{-15}$ erg) in FIG. 12, and comparison between the curve 23 and the curves 14, 15 in FIG. 4, the magnetization of the curves 23 rapidly decreases compared with those of curves 14, 15, 23, as the temperature rises.

Further, as seen from comparison between the curve 27 (exchange energy $J_{GdFe}$ of $-1.2 \times 10^{-15}$ erg) and the curve 26 (exchange energy $J_{GdFe}$ of $-1.7 \times 10^{-15}$ erg) in FIG. 13, and comparison between the curve 27 and the curves 18, 19 in FIG. 5, the curves 27 of the effective magnetic anisotropy energy Ku−2πMs$^2$ of rapidly decreases compared with those of curves 18, 19, 26, as the temperature rises.

These features are effective to improve the read-write characteristics of the magneto-optic recording medium as mentioned in the embodiment 1.

Figure 14:
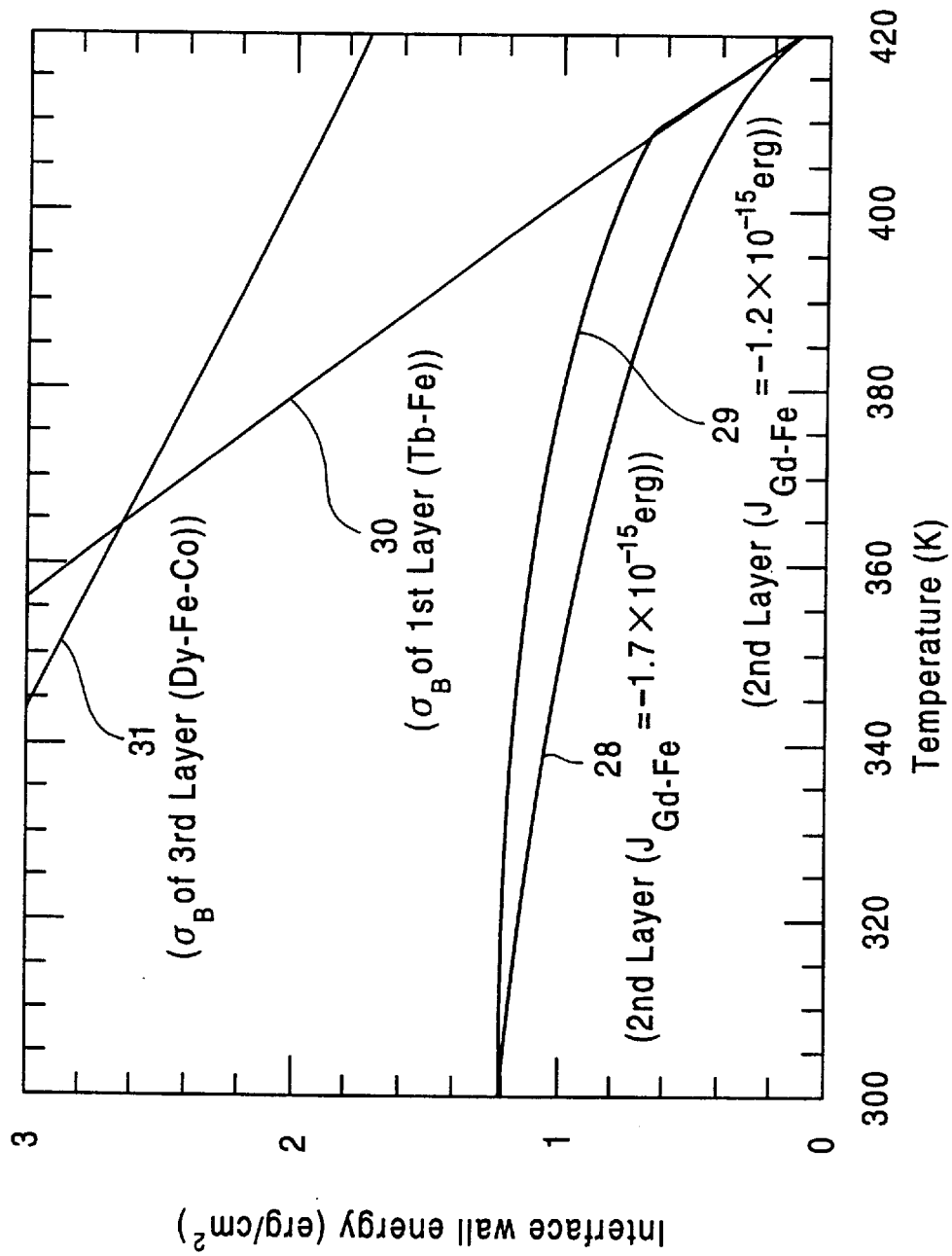
FIG. 14 is a graph showing interface wall energy vs temperature characteristics of the Gd—Fe layers with respect to the RE-rich layer and the RE-rich layer of which exchange energy between Gd atom and Fe atom is reduced, used as the 2nd magnetic layer in the magneto-optic recording medium 1.

FIG. 14 is a graph showing interface wall energy vs temperature characteristics of the Gd—Fe layers with respect to the RE-rich layer and the RE-rich layer of which exchange energy between Gd atom and Fe atom is reduced, either of which layers is used as the 2nd magnetic layer in the magneto-optic recording medium 1.

In FIG. 14, a reference character 28 denotes an interface wall energy vs temperature characteristic curve of the RE-rich layer employed as the 2nd magnetic layer where the exchange energy between Gd atom and Fe atom is made to be $-1.7 \times 10^{-15}$ erg. It should be noted that the curve 28 is identical to the curve 12 shown in FIG. 3. Reference numeral 29 denotes the one where the exchange energy between Gd atom and Fe atom is made to be $-1.2 \times 10^{-15}$ erg. Further, the reference numerals 30, 31 denote Bloch wall energy σB vs temperature characteristic curves of the 1st magnetic layer (Tb—Fe) 4 and the 3rd magnetic layer (Dy—Fe—Co) 6, which are identical to ones shown in FIG. 3

As seen from comparison between the curves 28, 29 in FIG. 14, the interface energy of the curve 29 of which exchange energy Is reduced to $-1.2 \times 10^{-15}$ erg, decreases more gradually degraded compared with the curve 28 of which exchange energy is $-1.7 \times 10^{-15}$ erg as the temperature rises.

Thus, these features suggest that the magnetic copy performance of the magneto-optic recording medium is more improved, as seen from the description in the embodiment 1.

Specifically, the condition of magnetic copy is determined by the formula 7 as mentioned in the foregoing.

From the formula 7, it is desirable for (Hc1−Hw1)<0 and the absolute value of (Hc1−Hw1) is larger, wherein Hc1 represents the coercivity of the 1st magnetic layer 4 and Hw1 represents the effective bias magnetic field which the 1st magnetic layer is received from an adjacent layer.

Figure 15:
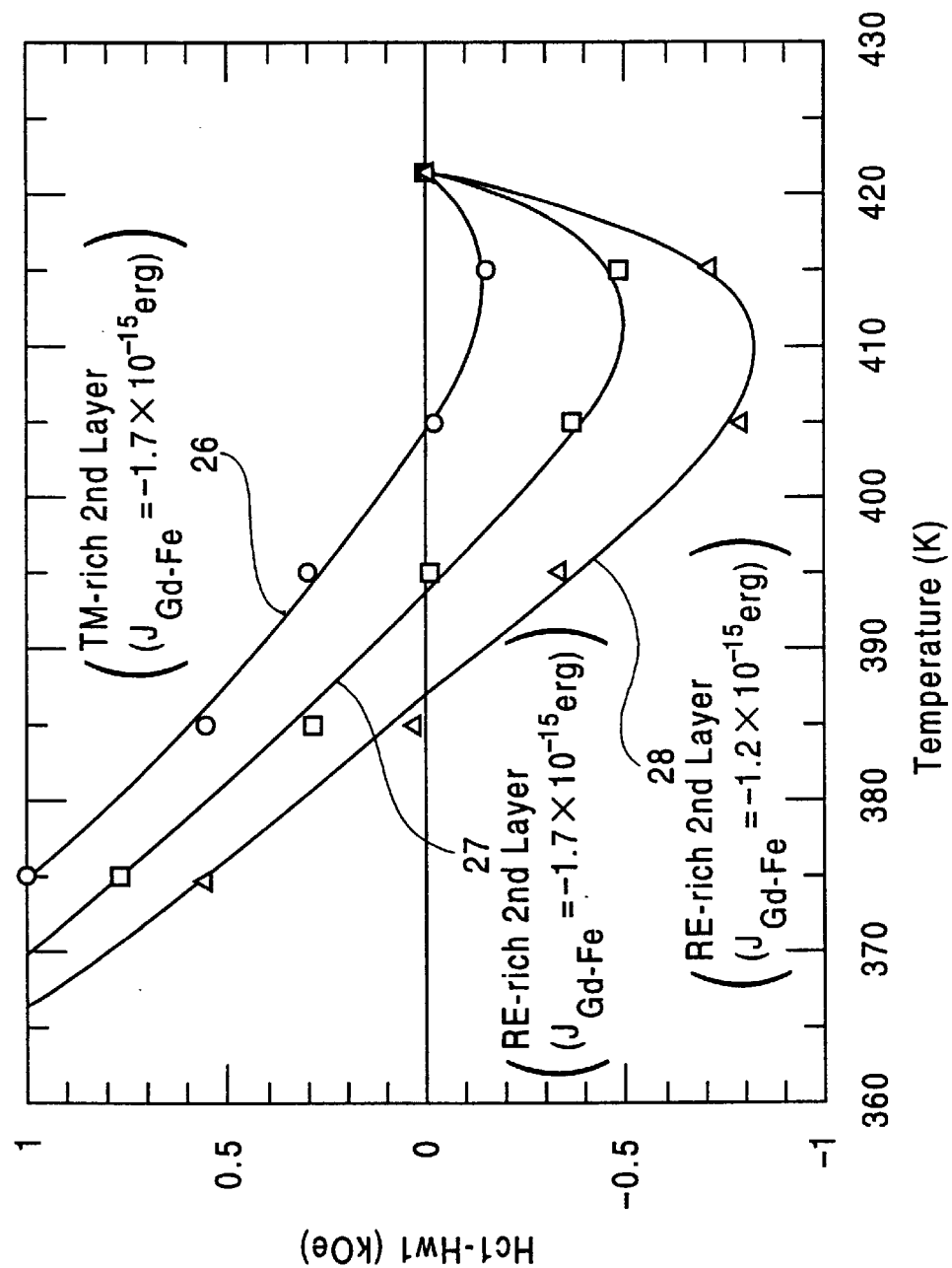
FIG. 15 is a graph showing (Hc1–Hw1) vs temperature characteristic curves of the 2nd magnetic layer with respect to the TM-rich layer and the RE-rich layer shown in FIG. 3 and the Re-rich layer of which exchange energy is reduced.

FIG. 15 is a graph showing (Hc1−Hw1) vs temperature characteristic curves of the 2nd magnetic layer with respect to the TM-rich layer and the RE-rich layer shown in FIG. 3 and the Re-rich layer of which exchange energy is reduced to $-1.2 \times 10^{-15}$ erg.

In FIG. 15, the ordinate represents Hc1−Hw1 (kOe) and the abscissa represents the temperature (K). Reference numeral 26 denotes a (Hc1−Hw1) vs temperature characteristic curve when the 2nd magnetic layer is made of the TM-rich layer having the exchange energy $J_{GdFe}$ of $-1.7 \times 10^{-15}$ erg, 27 is the one when the 2nd magnetic layer is made of the RE-rich layer having the exchange energy $J_{GdFe}$ of $-1.7 \times 10^{-15}$ erg, and 28 is the one when the 2nd magnetic layer is made of a RE-rich layer having the exchange energy $J_{GdFe}$ of $-1.2 \times 10^{-15}$ erg.

As seen from FIG. 15, the 2nd magnetic layer 5 shown with the reference numeral 28 shows the largest absolute value of Hc1−Hw1 within the negative range thereof among the three 2nd magnetic layers. Thus, it is considered that the recording medium having the 2nd magnetic layer shown with the reference character 28 is the best among the three recording mediums in magnetic copy performance.

Similarly, the recording medium having the 2nd magnetic layer 5 shown with the reference character 27 is considered to be better than that shown with the reference numeral 26 in the magnetic copy performance.

As a result, it is possible to improve the read-write characteristic of the triple-layered magneto-optic recording medium by employing the 2nd intermediate magnetic layer which is made of a RE-rich amorphous layer having Gd as the rare earth metal and Fe or Fe—Co as the 3rd transition metal and has the in-plane magnetic anisotropy at the room temperature and has a small exchange energy between the rare earth metal and the 3rd transition metal by adding such elements as Bi and Sn therein.

According to the magneto-optic recording medium of the present invention, it is possible to suppress the interface magnetic wall energy to a small value at the room temperature and maintain it large at the temperature T by employing the 2nd magnetic layer having a moderate thickness interposed between the 1st and 2nd magnetic layers, wherein the 2nd magnetic layer is made of the rare earth-transition metal of RE-rich having the in-plane magnetic anisotropy at the room temperature and is added with other metals such as Bi, Sn. Thereby, it is possible to improve the stability of the magnetic wall at the room temperature and to improve the stability of the magnetic copy performance of the written magnetic domain at the temperature T1.

Further, according to the present invention, it is possible to provide not only a magneto-optic recording medium capable of realizing the improvement of the light intensity modulation direct overwriting but also technics applicable to improvements and control of the exchange coupling force in the magnetic supper-resolution multilayer for the high density recording in future, and essential technics applicable to expansion and improvements of the magnetic read-write characteristics using the exchange coupling multilayer.

[Third embodiment]

As mentioned in the first embodiment, the temperature characteristics of the interface wall energy between the 1st and the 3rd magnetic layers 4, 6 is largely depended on the temperature characteristics of magnetization of the 2nd magnetic layer 5.

In the third embodiment, the rare earth metal such as Er (erbium), Ho (holmium) is used as the 2nd intermediate magnetic layer (intermediate layer) 5 to improve the temperature dependence of the magnetization effectively.

Figure 16:
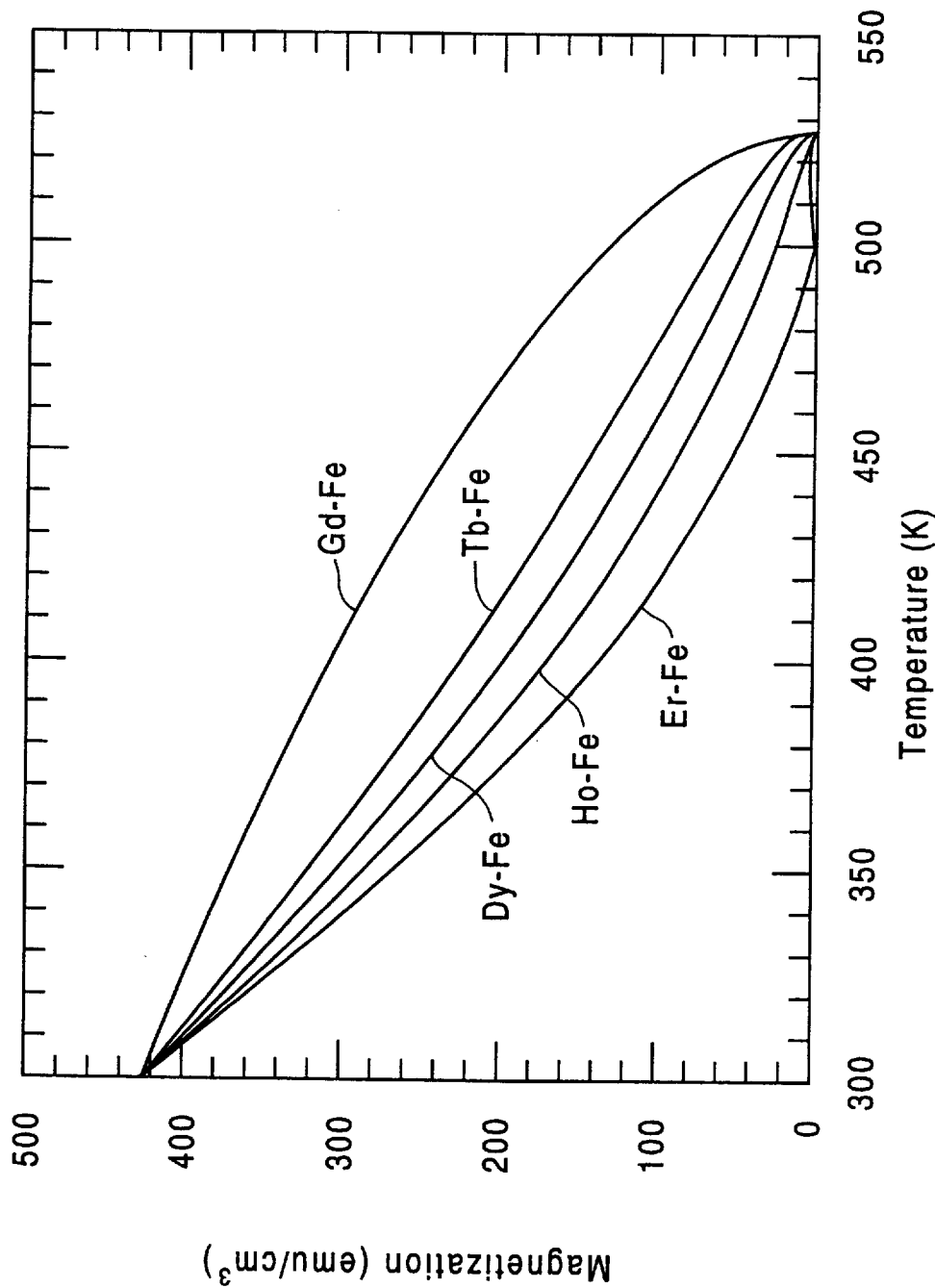
FIG. 16 is a graph showing magnetization vs temperature characteristic curves of five kinds of alloy thin layers, each composed of transition metal such as Fe (iron) and rare earth metal such as Gd (gadolinium), Tb (terbium), Dy (dysprosium), Ho (holmium) and Er (erbium)

FIG. 16 is a graph showing magnetization vs temperature characteristic curves of five kinds of alloy thin layers, each composed of the 3d transition metal such as Fe (iron) and rare earth metal such as Gd (gadolinium), Tb (terbium), Dy (dysprosium), Ho (holmium) and Er (erbium).

In order to improve the temperature characteristics of the interface wall energy, it is effective to reduce the magnetization thereof rapidly as the temperature rises.

As seen from FIG. 16, in order to reduce the magnetization of the thin film rapidly as the temperature rises, it is effective to employ an Er—Fe thin layer or an Ho—Fe thin layer compared with those of Gd—Fe, Tb—Fe, and Dy—Fe thin layer as the intermediate layer 5. Thereby, a magneto-optic recording medium having an excellent read-write characteristic can be realized by employing the Er—Fe or Ho—Fe thin layer as the 2nd magnetic layer 5.

Further, it is possible to add such elements as Bi, Sn and Lu to such Er—Fe or Ho—Fe thin layer so as to reduce the exchange energy between the rare earth metal and the 3d-transition metal. Thereby, further improvement of read-write characteristic of the magneto-optic recording medium will be expected as mentioned in the foregoing.

According to the magneto-optic recording medium of the third embodiment in the present invention, it is possible to suppress the interface magnetic energy to a small value at the room temperature and maintain it large with increasing temperature by employing the 2nd magnetic layer having a moderate thickness interposed between the 1st and 2nd magnetic layers, wherein the 2nd magnetic layer is made of the RE-rich layer having the in-plane magnetic anisotropy at room temperature such as Ho—Fe, Ho—Fe—Co, Er—Fe, Er—Fe—Co and is added with other metals such as Bi, Sn. Thereby, it is possible to improve the stability of the interface magnetic wall at the room temperature and to improve the magnetic copy performance the written magnetic domain at the temperature T1.

Next, the description is given of the magneto-optic recording mediums of the fourth to the seventh embodiments of the present invention referring to FIGS. 17 to 27.

Figure 17:
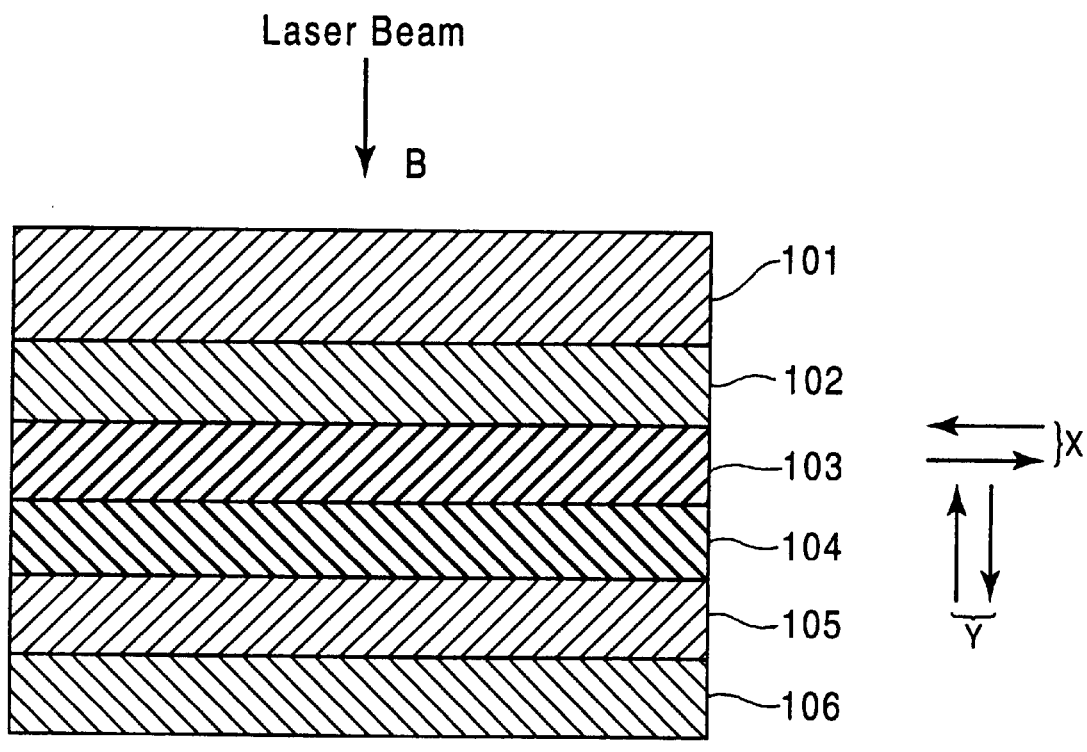
FIG. 17 is a schematic view for explaining a structure of a magneto-optic recording medium employed in the fourth to the seventh embodiments of the present invention.

FIG. 17 is a schematic view for explaining a structure of a magneto-optic recording medium employed in the fourth to the seventh embodiments of the present invention.

Figure 18:
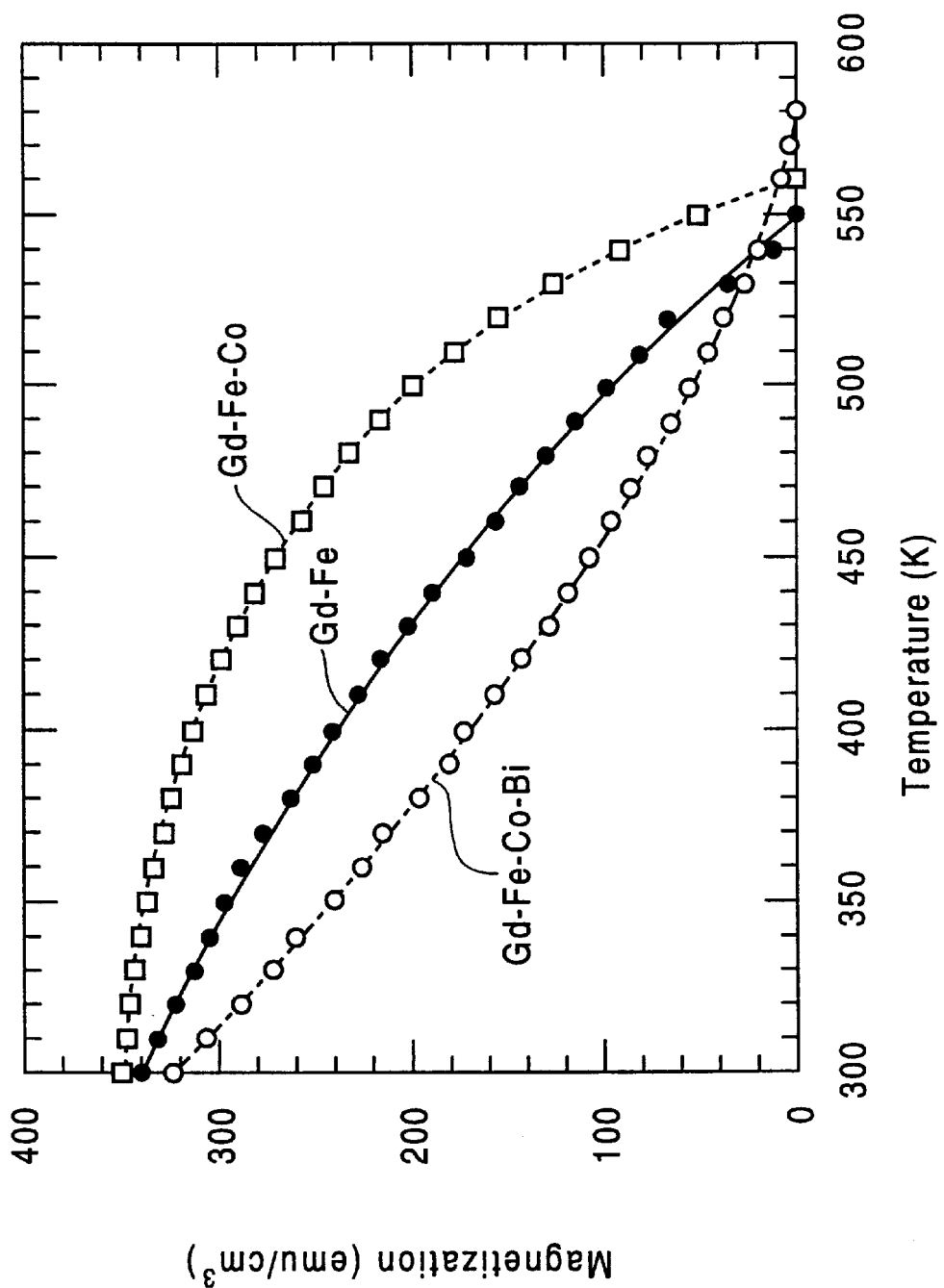
FIG. 18 is a graph showing magnetization vs temperature characteristic curves of for the three kinds of materials for comparison.
Figure 19:
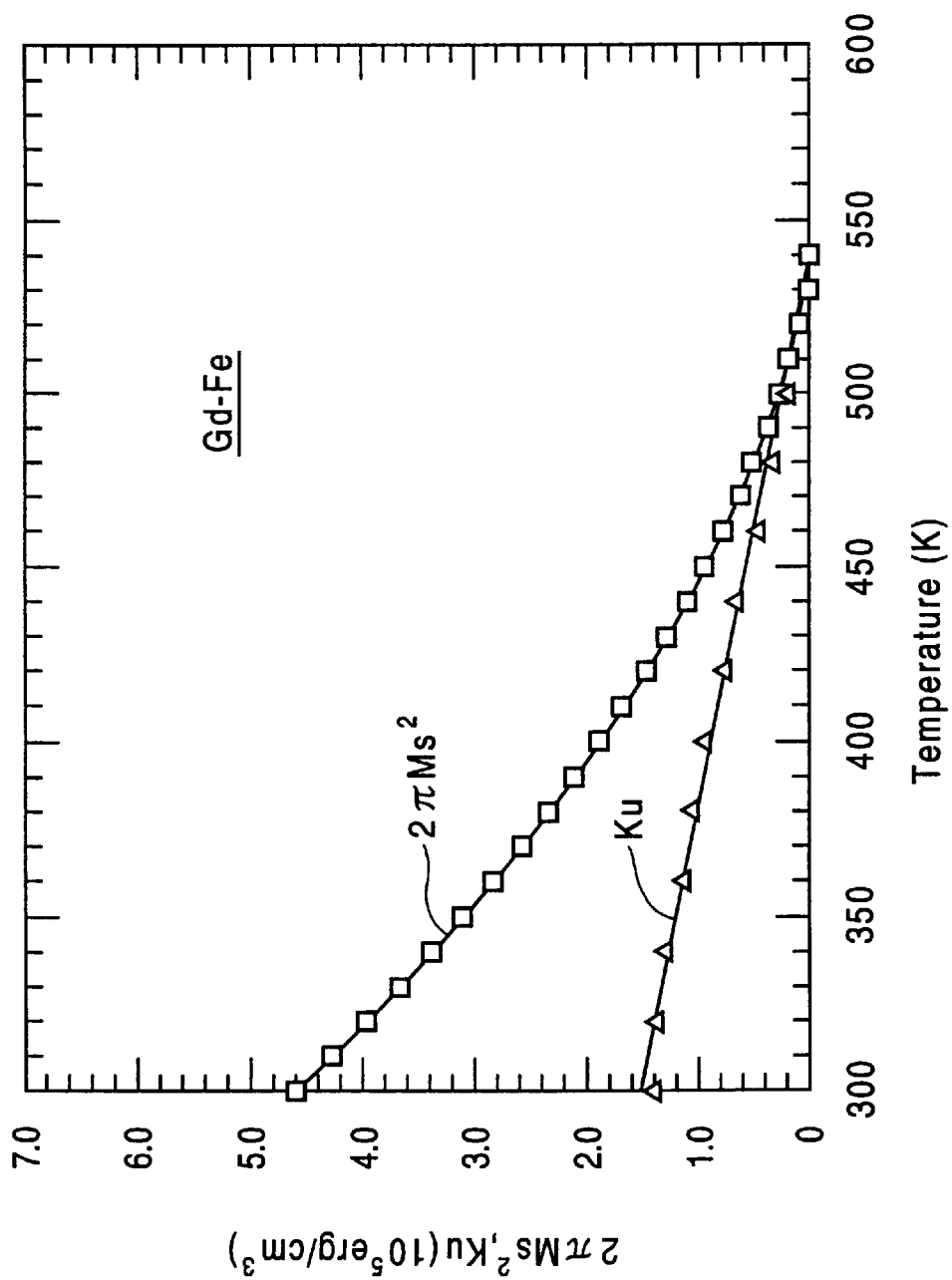
FIG. 19 is a graph showing an intrinsic magnetic anisotropy energy vs temperature characteristic curve and a demagnetizing field energy vs temperature curve of a material of Gd—Fe used in the first magnetic layer for comparison.
Figure 20:
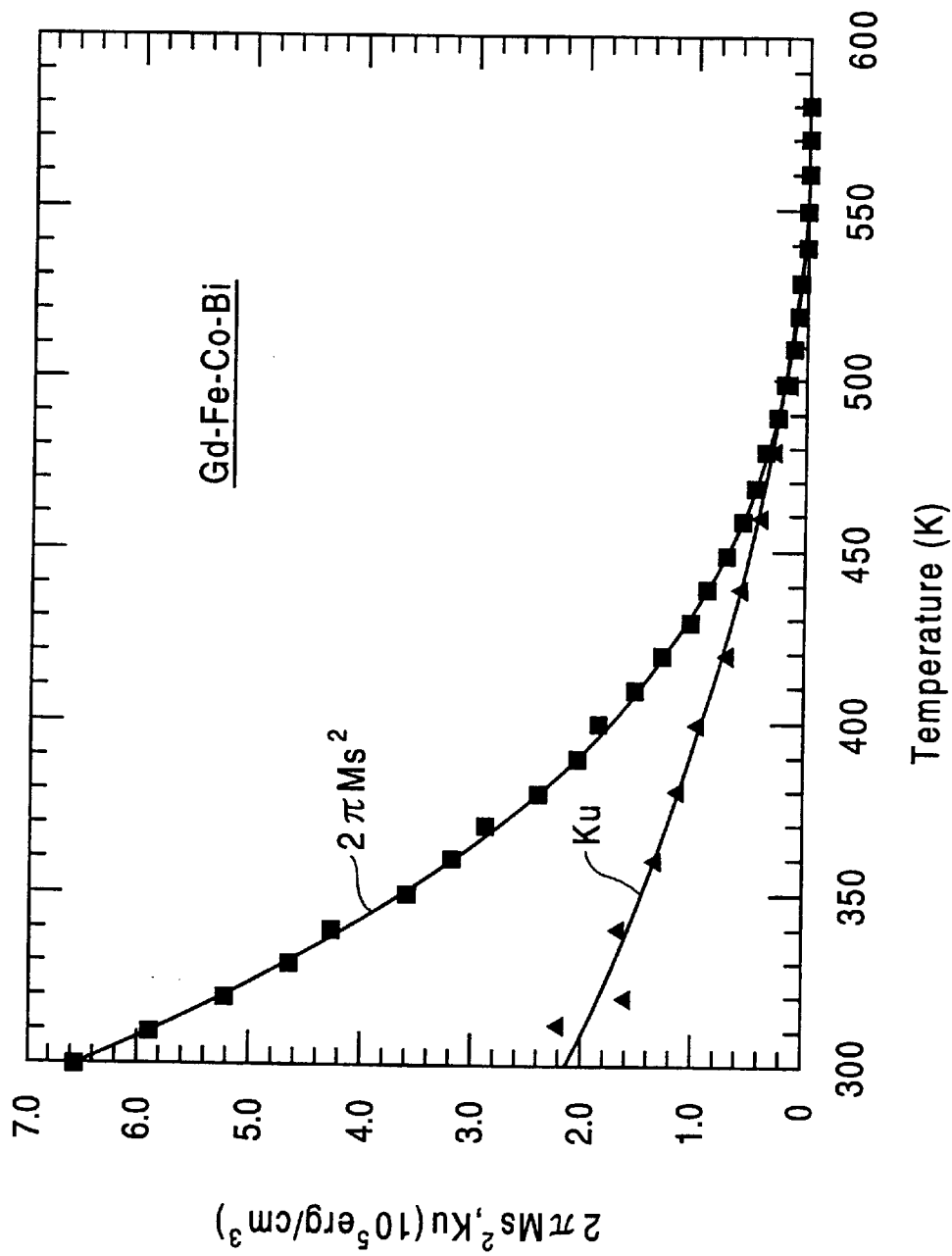
FIG. 20 is a graph showing an intrinsic magnetic anisotropy energy vs temperature characteristic curve and a demagnetizing field energy vs temperature characteristic curve of a material of Gd—Fe—Co—Bi of the present invention.
Figure 21:
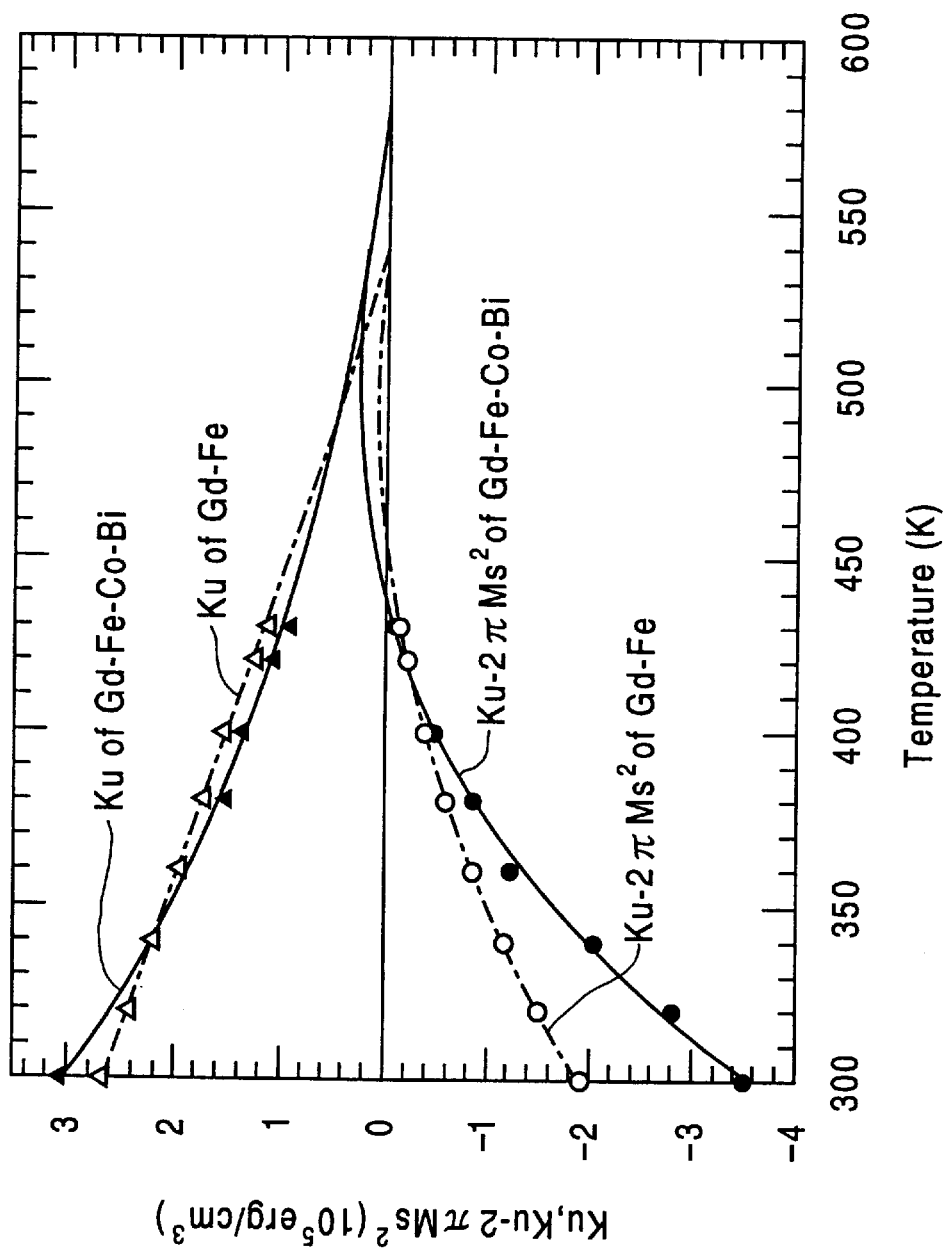
FIG. 21 is a graph showing intrinsic magnetic anisotropy energy vs temperature characteristic curves and effective magnetic anisotropy energy vs temperature curves of materials used as the first magnetic layer for comparison.
Figure 22:
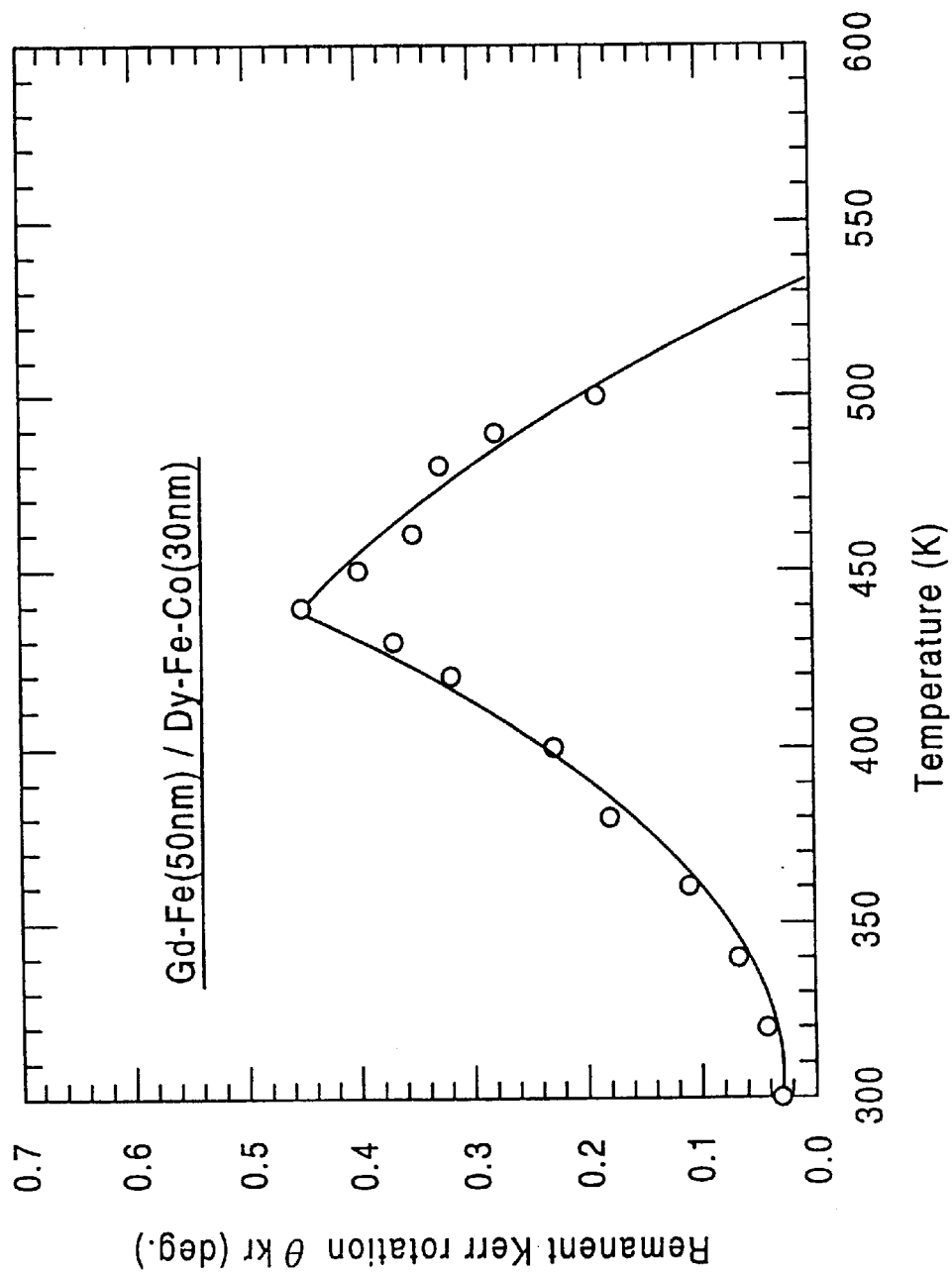
FIG. 22 is a graph showing the temperature dependence of the remanent Kerr rotation of the magneto-optic recording medium when Gd—Fe is employed as the first magnetic layer and Dy—Fe—Co is employed as the second magnetic layer.

FIG. 18 is a graph showing magnetization vs temperature characteristic curves of materials used in the first magnetic layer for comparison;

FIG. 19 is a graph showing an intrinsic magnetic anisotropy energy vs temperature characteristic curve and the demagnetizing field energy vs temperature curve of a material of Gd—Fe used in the first magnetic layer for comparison;

FIG. 20 is a graph showing an intrinsic magnetic anisotropy energy vs temperature characteristic curve and a demagnetizing field energy vs temperature characteristic curve of a material of Gd—Fe—Co—Bi of the present invention;

FIG. 21 is a graph showing intrinsic magnetic anisotropy energy vs temperature characteristic curves and demagnetizing field energy vs temperature curves of materials used as the first magnetic layer for comparison;

FIG. 22 is a graph showing the remanent Kerr rotation angle of a magneto-optic recording medium when Gd—Fe is employed as the first magnetic layer and Dy—Fe—Co is employed as the second magnetic layer.

Figure 23:
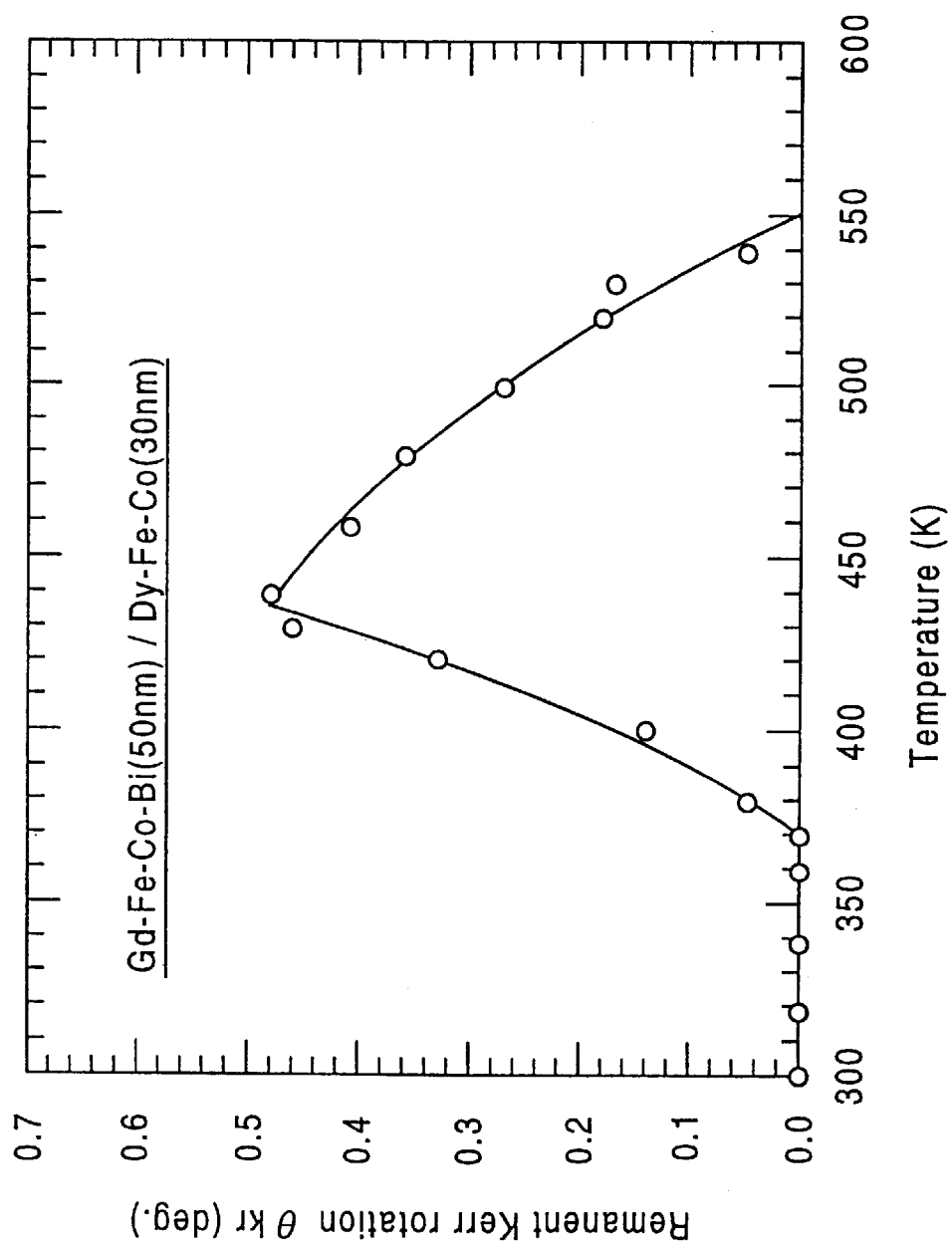
FIG. 23 is a graph showing the temperature dependence of the remanent Kerr rotation of the magneto-optic recording medium when Gd—Fe—Co—Bi is employed as the first magnetic layer and Dy—Fe—Co is employed as the second magnetic layer.
Figure 24:
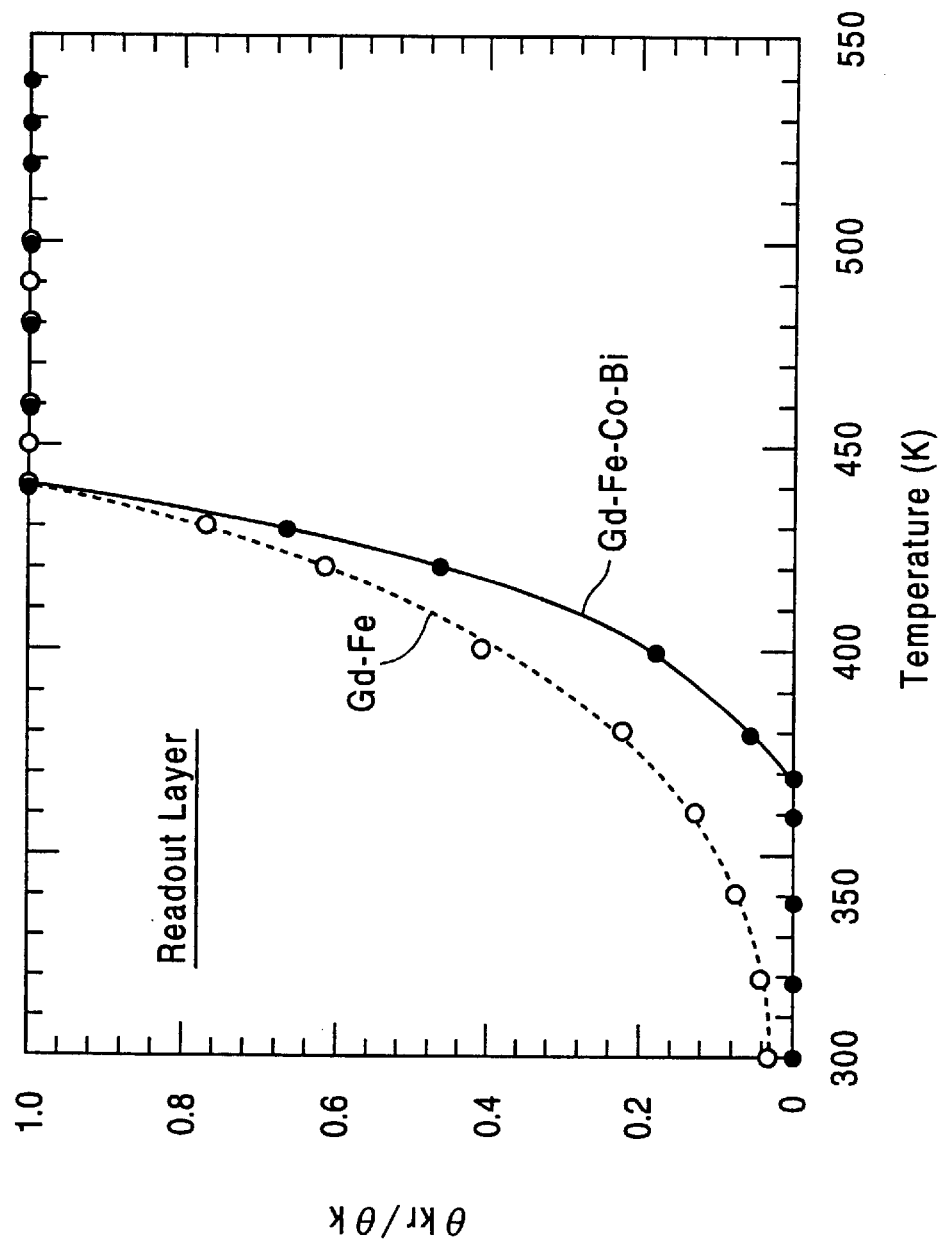
FIG. 24 is a graph showing magneto-optic effect vs temperature characteristics of magneto-optic recording mediums when Gd—Fe and Gd—Fe—Co—Bi are respectively employed as the first magnetic layer (readout layer) and Dy—Fe—Co is employed as the second magnetic layer, wherein the magneto-optic effect is represented by the remanent Kerr rotation θkr by normalized a saturation Kerr rotation angle θk.
Figure 25:
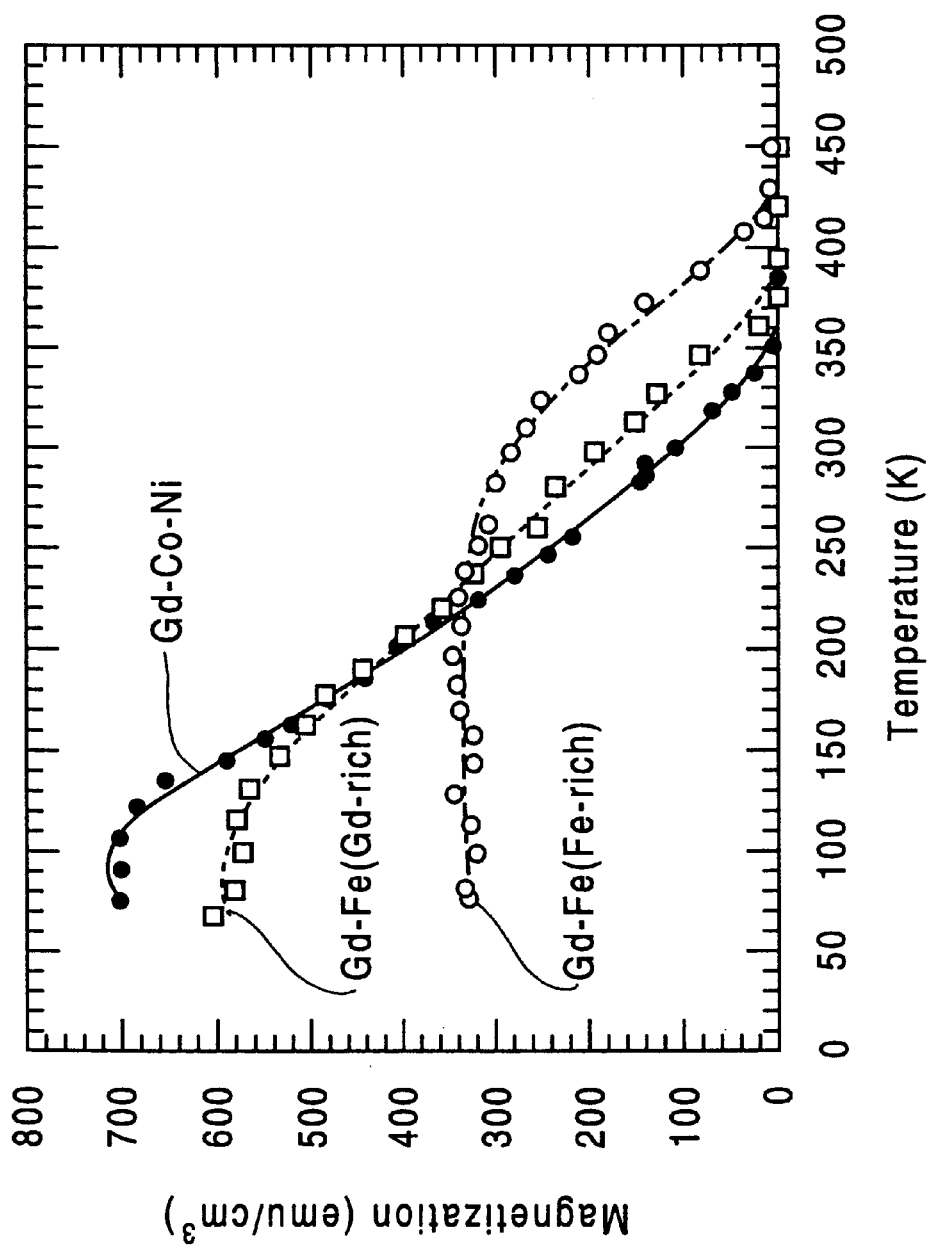
FIG. 25 is a graph showing a magnetization vs temperature characteristic for the three kinds of materials.
Figure 26:
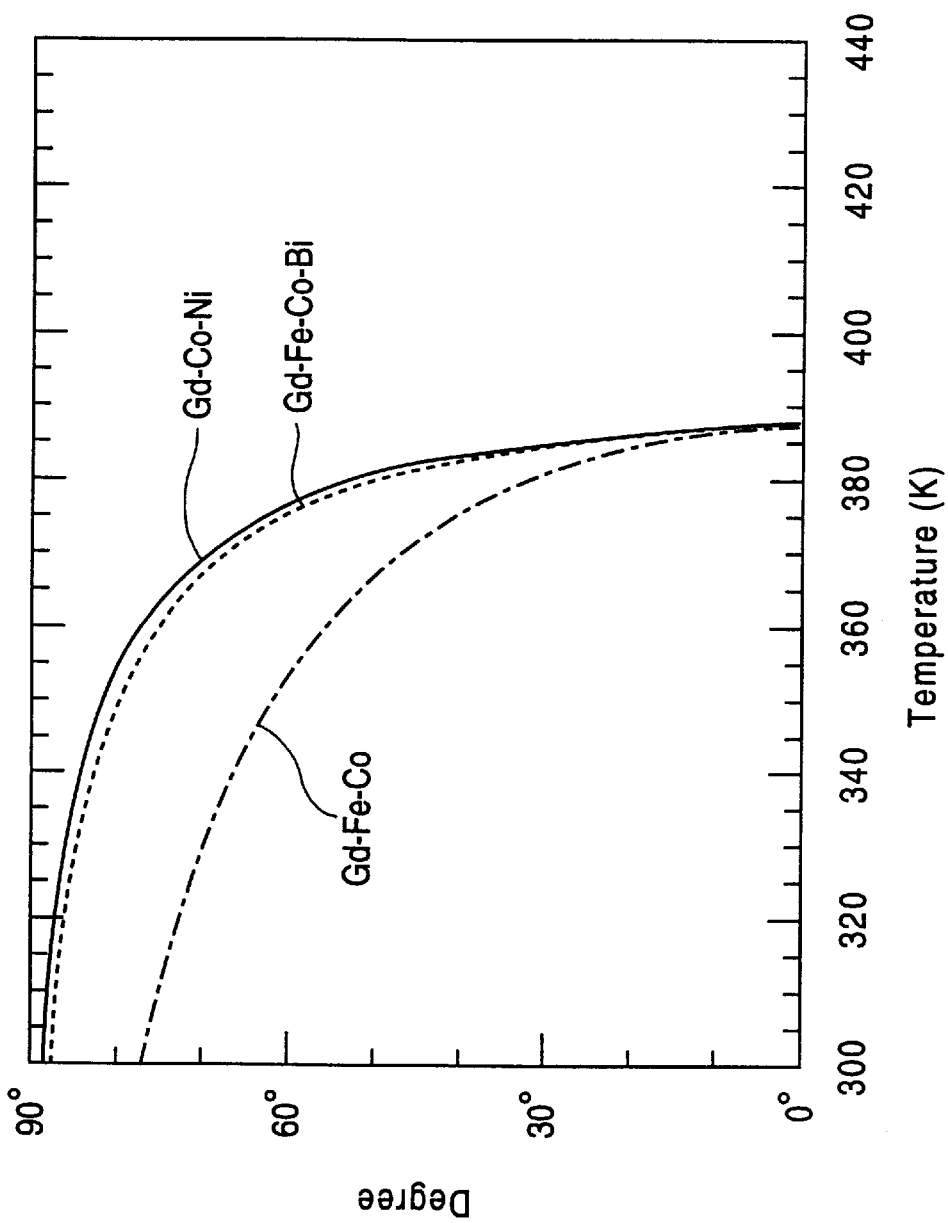
FIG. 26 is a graph showing a temperature dependence of a transition angle of magnetization on a final atomic plane of the first magnetic layer obtained by a calculation result, wherein a perpendicular direction to the film is made to be 0 degree, and an in-plane direction of the film is made to be 90 degrees.
Figure 27:
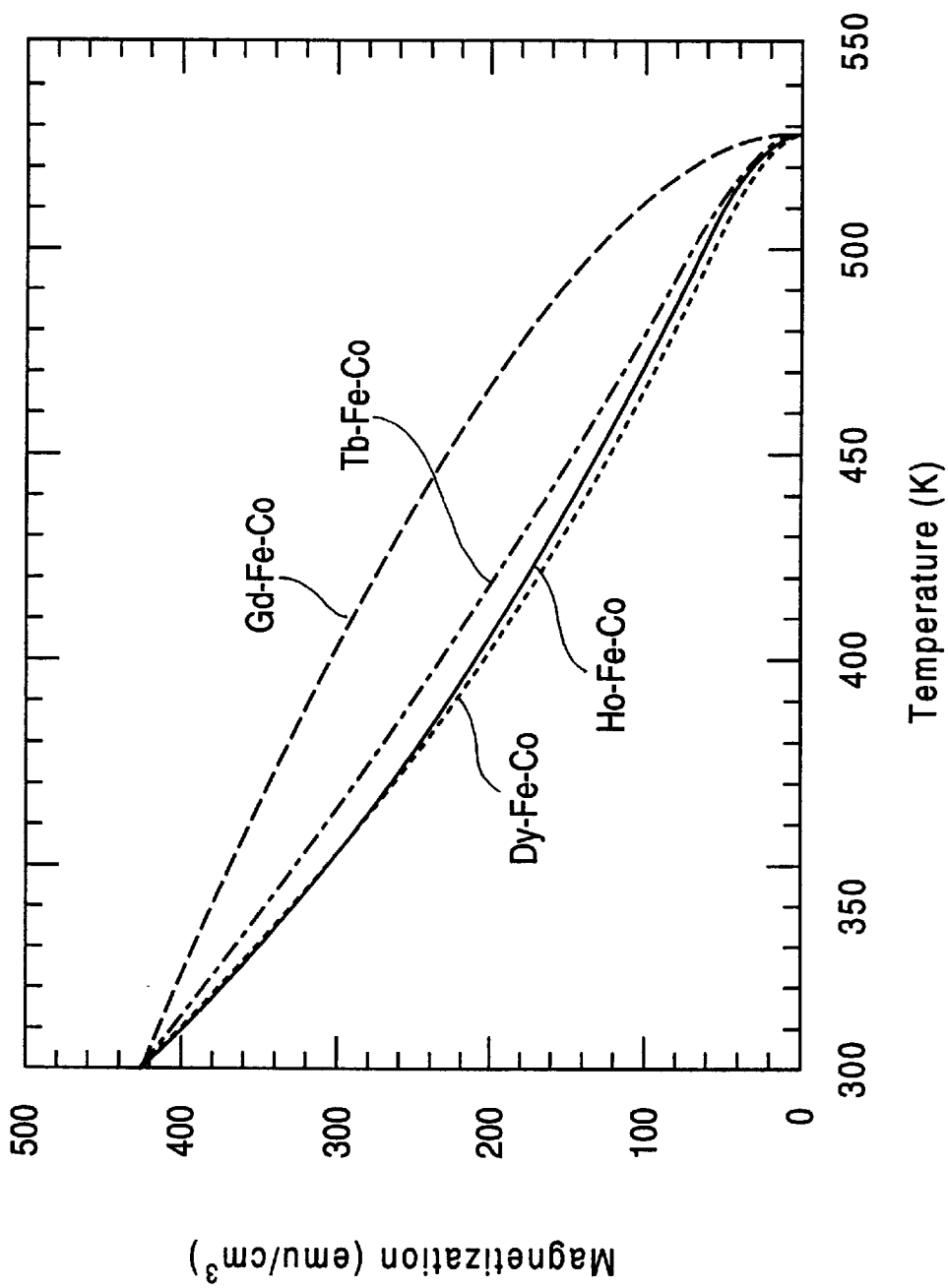
FIG. 27 is a graph showing magnetization vs temperature characteristics for the three kinds of material obtained by a calculation based on a molecular field theory.

FIG. 23 is a graph showing the remanent Kerr rotation angle of a magneto-optic recording medium when Gd—Fe—Co—Bi is employed as the first magnetic layer and Dy—Fe—Co is employed as the second magnetic layer;

FIG. 24 is a graph showing magneto-optic effect vs temperature characteristics of magneto-optic recording mediums when a respective one of the Gd—Fe and Gd—Fe—Co—Bi is employed as the first magnetic layer (readout layer) and Dy—Fe—Co is employed as the second magnetic layer, wherein the magneto-optic effect is represented by the remanent Kerr rotation angle θkr normalized by a saturation Kerr rotation angle θk;

FIG. 25 is a graph showing a magnetization vs temperature characteristic of materials used as the first magnetic layer;

FIG. 26 is a graph showing the temperature dependence of the angle of magnetization direction on a final atomic plane of the first magnetic layer obtained from a calculation result, wherein a perpendicular direction to the film is made to be 0 degree, and an in-plane direction of the film is made to be 90 degrees; and FIG. 27 is a graph showing magnetization vs temperature characteristics of materials used as the first magnetic layer obtained by a calculation based on a molecular field theory.

Next, the explanation is given of the fourth to the seventh embodiments.

[Fourth embodiment]

Referring to FIG. 17, a magneto-optic recording medium 1a of the present invention comprises a transparent substrate 101, a dielectric layer 102, a first magnetic layer 103 (readout layer), a second magnetic layer (recording layer) 104, and a dielectric layer 105. They are stacked in this order. A protection layer 106 is provided on the dielectric layer 5, when necessary. The laser beam is irradiated on the surface of the magneto-optic recording medium 1a in a direction shown with an arrow B.

The transparent substrate 101 is made of a glass plate or a polycarbonate plate. The dielectric layer 102 is made of a transparent dielectric film as a protection layer or multi-interference layer. The first and second magnetic layers 103, 104 are successively formed in vacuum by using a continuous sputtering method, resulting in a double layer magnetic thin film.

The dielectric layer 105 is made of a non-magnetic metal layer or a dielectric film. The protection layer 106 is formed by using UV (ultraviolet-rays) curing resin on the dielectric layer 105 when necessary.

The first magnetic layer 103 shows an in-plane magnetization with an easy axis of magnetization in a direction shown with an arrow X at the room temperature 300k, and as the temperature rises more than the room temperature, it shows a perpendicular magnetization having an easy axis of magnetization in a direction shown with an arrow Y. The first magnetic layer 103 is mainly made of a rare earth-3d transition metal alloy.

Further, in the first magnetic layer 103, the exchange energy between the rare earth metal and the 3d transition metal is small. The first magnetic layer 103 which shows the perpendicular magnetization above the room temperature has reversibility to show the in-plane magnetization instantly when the temperature descends after the first magnetic layer 103 operates as a perpendicular magnetization layer. The information is read out from the first magnetic layer 103. Thus, it may be referred to as a readout layer.

The second magnetic layer 104 is made of a rare earth-3d transition metal alloy having an easy axis of magnetization in a perpendicular direction shown with an arrow Y in the temperature range from the room temperature up to the Curie point. The information is recorded on the second magnetic layer 104. Thus, this layer may be referred to as a recording layer.

As materials for forming the first magnetic layer 103, for instance, Gd—Fe—Co—Bi (gadolinium-iron-cobalt-bismuth alloy) is used. As materials for forming the second magnetic layer 104, for instance, Dy—Fe—Co (dysprosium-iron-cobalt) is used. The temperature dependence of the saturation magnetization for Gd—Fe, Gd—Fe—Co and Fe—Co—Bi films is shown in FIG. 18.

In the FIG. 18, the abscissa represents the temperature (K), and the ordinate represents a magnitude of a saturation magnetization (emu/cm$^3$).

As shown in FIG. 18, in the temperature dependence of the saturation magnetization for Gd—Fe, Gd—Fe—Co and Gd—Fe—Co—Bi films, a magnitude of saturation magnetization reduces as the temperature rises. The degree of reduction is smaller in the order of Gd—Fe—Co—Bi, Gd—Fe and Gd—Fe—Co.

It may be possible to change the temperature characteristics of Gd—Fe and Gd—Fe—Co by controlling an amount of Gd thereof, however, it is impossible to allow them to have such a rapidly descending curve as that of Gd—Fe—Co—Bi.

Referring to FIGS. 19 and 20, the temperature dependence of the intrinsic magnetic anisotropy energy Ku and the demagnetizing field energy $2\pi Ms^2$ for Gd—Fe or Gd—Fe—Co—Bi film are shown, respectively.

In FIGS. 19 and 20, the ordinate represents a magnitude of demagnetizing field energy $2\pi Ms^2$ and a magnitude of an intrinsic anisotropy magnetic energy Ku. The unit of energy is $10^5$ erg/cm$^3$. The abscissa represents the temperature (K). As seen from FIG. 18, the temperature characteristic curve of magnetization of Gd—Fe—Co—Bi indicates sharper drop than those of Gd—Fe and Gd—Fe—Co.

Further, as seen from FIGS. 19 and 20, the temperature dependence of the demagnetizing field energy $2\pi Ms^2$ of Gd—FeCo—Bi change more rapidly than those of Gd—Fe.

From the above facts, it is said that the more rapidly the curve of saturation magnetization changes, the more rapidly the curve of demagnetizing field energy is changed. As an example of such a material, there is Gd—Fe—Co—Bi.

Next, the description is given of examples of the magneto-optic recording medium 1a where Gd—Fe or Gd—Fe—Co—Bi is used as the first magnetic layer 103 thereof, for instance, both cases where the first magnetic layer 103 is formed with Gd—Fe or Gd—Fe—Co—Bi. In both the cases, other constituting components (the transparent substrate 1, the dielectric layers 2 and 5, the second magnetic layer 4 and the protection layer 6) are formed with the same components as those shown in FIG. 17.

The temperature dependence curves of the intrinsic magnetic anisotropy energy Ku and of the effective magnetic anisotropy energy Ku–$2\pi Ms^2$ for the respective magneto-optic recording mediums 1a in which the first magnetic layer is formed by Gd—Fe or Gd—Fe—Co—Bi, are shown in FIG. 21, respectively.

In FIG. 21, the ordinate represents the effective magnetic anisotropy energy Ku–$2\pi Ms^2$($10^5$ erg/cm$^3$) and the abscissa represents the temperature (K). As shown in FIG. 21, as temperature rises, each intrinsic magnetic anisotropy energy Ku of Gd—Fe or Gd—Fe—Co—Bi changes similarly to each other and the effective magnetic anisotropy energy Ku–$2\pi Ms^2$ of Gd—Fe—Co—Bi increases rapidly compared with that of Gd—Fe. This fact can be explained by the temperature dependence of demagnetizing field energy $2\pi Ms^2$ shown in FIGS. 19 and 20.

It should be noted that such temperature dependence of the intrinsic magnetic anisotropy energy Ku and the effective magnetic anisotropy energy Ku–$2\pi Ms^2$ of Gd—Fe—Co—Bi is effective to improve the problem mentioned in the Description of the Related Arts.

In other words, it contributes to solve such a problem that in the material forming the readout layer (the first layer), as the temperature range to allow the magnetization transition from the in-plane to the perpendicular magnetization is broad, it is insufficient to read out the information recorded on the area (information magnetic domain) much smaller than the diameter of the laser spot.

Specifically, as the material for forming the readout layer (the first magnetic layer), it is desirable to employ an alloy of which exchange energy between the rare earth metal and the 3d transition metal is small. Thereby, the alloy has a narrow temperature range to allow the magnetic transition from the in-plane to the perpendicular magnetization, resulting in a magneto-optic recording medium capable of reading out the high density information recorded on the area (information magnetic domain) narrower than the diameter of the laser spot in the readout layer without degradation of S/N. This magneto-optic recording medium realizes a super-resolution readout.

In FIG. 21, the temperature at which the effective magnetic anisotropy energy Ku–$2\pi Ms^2$ changes its sign from negative to positive, (i.e., the temperature at which the effective magnetic anisotropy energy Ku–$2\pi Ms^2$ becomes zero) is about 440 K in both cases of Gd—Fe—Co—Bi and Gd—Fe.

Here, the negative sign of the effective magnetic anisotropy energy represents the in-plane magnetization state and the positive sign represents the perpendicular magnetization state. The super-resolution readout is realized around the temperature mentioned above.

Thus, it is important to solve the problem mentioned in the Description of the Related Art that how the magnetization transition is rapidly changed near the temperature of 440K.

In FIGS. 22 and 23, there are shown the temperature dependence of remanent Kerr rotation in the magneto-optic recording mediums 1a where Gd—Fe or Gd—Fe—Co—Bi is used as the first magnetic layer (readout layer), respectively and Dy—Fe—Co is used as the second magnetic layer. In the FIGS. 22 and 23, the ordinate represents remanent Kerr rotation angles θkr (degree).

Specifically, the first magnetic layer 103 of the magneto-optic recording medium 1a shown in FIG. 17 is made of Gd—Fe (FIG. 22) or Gd—Fe—Co—Bi (FIG. 23).

The same components as those shown in FIG. 17 are used as other corresponding components (the transparent substrate 101, the dielectric layers 102 and 105, the second magnetic layer 104 made of Dy—Fe—Co, and the protection layer 106) except the first magnetic layer 103. Here, a thickness of the first magnetic layer 103 of Gd—Fe or Gd—Fe—Co—Bi is made to be 50 nm, and a thickness of the second magnetic layer 104 is made to be 30 nm.

As shown in FIG. 22, in the temperature dependence curve of remanent Kerr rotation (degree) of the first magnetic layer 103 made of Gd—Fe in the magneto-optic recording medium 1a, the magneto-optic effect for reading out, i.e., a Kerr rotation angle, is slowly rising with respect to the temperature of 440K in a temperature range of 300 to 440K.

On the other hand, as shown in FIG. 23, in the temperature dependence of remanent Kerr rotation angle of the first magnetic layer 103 made of Gd—Fe—Co—Bi in the magneto-optic recording medium 1a, the Kerr rotation thereof, is rapidly rising with respect to the temperature of 440K in a temperature range of 370 to 440K, which is narrower than the range of 300 to 440K shown in FIG. 22.

The difference between the characteristics shown in FIGS. 22 and 23 suggests a further improvement of the super-resolution detection effect.

FIG. 24 is a graph for clarifying the difference between the temperature dependence of the remanent Kerr rotation shown in FIGS. 22 and 23.

In FIG. 24, the abscissa represents the temperature (K) and the ordinate represents θkr/θk which is the remanent Kerr rotation θkr normalized by the saturation Kerr rotation θk for comparison of readout characteristics, i.e., the temperature dependence of the magneto-optic effect.

As shown in FIG. 24, a curve representing the first magnetic layer 103 using Gd—Fe—Co—Bi shows a steep rise compared with a curve of the first magnetic layer 103 formed with Gd—Fe. The fact that the value of θkr/θk rapidly rises, is equivalent to that a magnetization transition occurs near 440K. Accordingly, it will be understood that it is effective to form the first magnetic layer with Gd—Fe—CoBi.

This excellent result can be explained by an effectiveness of Bi, i.e., reduction of exchange integral between the rare earth metal (referred to as RE) and the 3d transition metal (referred to as TM). The exchange energy of Gd—Fe—Co is reduced by the addition of Bi, resulting in a rapid reduction of magnetization of Gd—Fe—Co—Bi by the rise of temperature.

Generally, an amount of exchange energy between the RE and the TM in RE—Fe—Co alloy is represented by a formula (8) as follows.

$$J_{RE-Fe} \cdot S_{RE} \cdot S_{FE} + J_{RE-Co} \cdot S_{RE} \cdot S_{Co} \quad (8)$$

Wherein, $J_{RE-Fe}$: exchange integral between RE (rare earth) and Fe
$J_{RE-Co}$: exchange integral between RE and Co
$S_{RE}$: RE spin
$S_{FE}$: Fe spin
$S_{Co}$: Co spin When the exchange energy between the RE and the TM is reduced, the sublattice magnetization of the RE supported by the sublattice magnetization of the TM is weakened, the RE sublattice magnetization is rapidly reduced as the temperature rises. As a result, it is considered that the change of the saturation magnetization due to the change of temperature is developed rapidly.

The addition of Bi or Sn to Gd—Fe corresponds to the reduction of $J_{RE-Fe}$ in the formula (8). Accordingly, a similar result that the first magnetic layer 103 is made of Gd—Fe—Co—Bi, is also obtained in a case where the first magnetic layer 103 is made of Gd—Fe—Co—Sn.

[Fifth embodiment]

The problem mentioned in the foregoing can be solved by reducing the exchange energy between the RE and the TM in the first magnetic layer 103 of the magneto-optic recording medium 1a in the present invention.

Furthermore, it will be understood from the formula (8) that it is possible to reduce the exchange energy by reducing the Fe spin of the first magnetic layer 103.

The reduction of the Fe spin can be made by adding Ni and Co to the first magnetic layer 103.

There is shown a result for verifying this effect in FIG. 25, wherein saturation magnetization vs temperature characteristics of three kinds of thin magnetic layers of Gd—Co—Ni, Gd—Fe (Gd-rich) and Gd—Fe (Fe-rich) are represented.

With respect to the Gd—Co—Ni layer, the saturation magnetization rapidly reduces as the temperature rises. Accordingly, it is possible to solve the problem mentioned in the foregoing by employing Gd—Co—Ni as the first magnetic layer 103.

[Sixth embodiment]

There is shown in FIG. 26 a calculation result for verifying the fourth and fifth embodiments of the present invention.

In FIG. 26, the ordinate represents magnetization rotation angle (degree) on the readout surface of the first magnetic layer 103, and the abscissa represents the temperature (K), wherein the magnetization rotation angle in the perpendicular direction to the film surface is made to be zero.

In the Gd—Fe—Co—Bi where the exchange integral between RE and TM is decreased, and the Gd—Co—Ni where the Fe spin is decreased, used as the first magnetic layer 103 in the magneto-optic recording medium 1a of the present invention, the magnetization transition of the first magnetic layer 103 is rapidly developed from the in-plane direction (90°) to the perpendicular direction (0°) compared with that of Gd—Fe—Co in the prior art.

Further, these calculations of the fourth and fifth embodiments are performed under the temperature where the magnetization orientation of each of the first magnetic layers is completely aligned in the perpendicular direction so that differences of magnetization transition characteristics among the three kinds of the first magnetic layer 3 are made to be clear.

Further, a result with respect to Gd—Fe—Co—Sn coincides with that of Gd—Fe—Co—Bi.

[Seventh embodiment]

As well known, the larger an atomic number becomes, the smaller heavy RE spin becomes.

Accordingly, it is considered that to replace Gd of Gd—Fe—Co with a heavy rare earth metal having an atomic number larger than that of Gd is effective to reduce a value of the exchange energy between RE and TM as well as a reduction of the exchange integral and a reduction the Fe spin.

Changes of the saturation magnetization Ms due to a temperature change are calculated in cases where Gd of Gd—Fe—Co is replaced with heavy rare earth metal (Tb, Ho, Dy) based on the molecular field theory by using parameters of the Hund's rule. The results are shown in FIG. 27.

As seen from FIG. 27, the saturation magnetization Ms of Tb—Fe—Co, Dy—Fe—Co and Ho—Fe—Co rapidly decreases as the temperature rises compared with that of Gd—Fe—Co.

As a result, it will be understood that addition or replacement of heavy rare earth metal, i.e., Tb, Dy, Ho, Er, Tm, Yb, and Lu, made to the first magnetic layer 103 is effective to solve the problem mentioned in the foregoing.

According to the magneto-optic recording medium in the present invention, as the materials for forming the readout layer (the first magnetic layer), an alloy which can realize the rapid transition from the in-plane to the perpendicular magnetization within a narrow temperature range due to a small exchange energy between the rare earth metal and the 3d transition metal, is employed, resulting in the magneto-optic recording medium capable of reading out the high density information recorded on the area smaller than the diameter of the laser spot, and eliminating a cross-talk problem when reading. Thus, it is possible to provide an magneto-optic recording medium as a super-resolution readout medium density with an improved high S/N (C/N) compared with that in the prior art.

What is claimed is:

1. Magneto-optic recording medium having at least a 1st magnetic layer for recording information signals, a 2nd magnetic layer formed on the 1st magnetic layer and a 3rd magnetic layer formed on the 2nd magnetic layer, the magneto-optic recording medium comprising:

the 1st and 3rd magnetic layers each being made of a first amorphous material of rare earth and transition metal having perpendicular magnetic anisotropy in a direction perpendicular to a surface thereof, respectively; and the 2nd magnetic layer interposed between the 1st and 3rd magnetic layers as an intermediate layer, the 2nd magnetic layer being made of a second amorphous material of a rare earth metal and a transition metal with rare earth metal rich (RE-rich), the second amorphous material having a small exchange energy between the rare earth metal and the transition metal, and having in-plane magnetic anisotropy in a direction parallel to a surface of the 2nd magnetic layer at a temperature not less than 100° C., wherein the 1st and the 3rd magnetic layers are magnetically coupled through the 2nd magnetic layer.

2. Magneto-optic recording medium comprising:

a first magnetic layer formed on a transparent substrate for reading information recorded on a second magnetic layer, the first magnetic layer having an easy axis of magnetization in a direction parallel to a surface thereof at a room temperature, the easy axis of magnetization being changed into a perpendicular direction from the in-plane direction when heated up to a predetermined temperature higher than the room temperature, the first magnetic layer being made of a rare earth and a transition metal in which an exchange energy between the rare earth metal and the transition metal is made to be small, and a second magnetic layer provided on the first layer for magneto-optically recording information and transferring the information to the first magnetic layer for reading out the information, the second magnetic layer being made of a rare earth transition metal alloy having an easy axis of magnetization in a direction perpendicular a surface thereof at a room temperature.

3. Magneto-optic recording medium as claimed in claim 2, wherein the first magnetic layer is made of Gd—Fe—Co—Bi.

4. Magneto-optic recording medium as claimed in claim 2, wherein the first magnetic layer is made of Gd—Fe—Co—Sn.

5. Magneto-optic recording medium as claimed in claim 2, wherein the first magnetic layer is made of Gd—Co—Ni.

6. Magneto-optic recording medium as claimed in claim 3, wherein an additive selected from a group of rare earth metals of Tb, Dy, Ho, Er, Tm, Yb and Lu is added to the first magnetic layer of Gd—Fe—Co—Bi.

7. Magneto-optic recording medium as claimed in claim 3, wherein a material Gd in Gd—Fe—Co—Bi used in the first magnetic layer is replaced with one selected from a group of rare earth metals of Tb, Dy, Ho, Er, Tm, Yb, and Lu.

8. Magneto-optic recording medium as claimed in claim 4, wherein an additive selected from a group of rare earth metals of Tb, Dy, Ho, Er, Tm, Yb and Lu is added to the first magnetic layer of Gd—Fe—Co—Sn.

9. Magneto-optic recording medium as claimed in claim 4, wherein a material Gd in Gd—Fe—Co—Sn used in the first magnetic layer is replaced with one selected from a group of rare earth metals of Tb, Dy, Ho, Er, Tm, Yb, and Lu.

10. Magneto-optic recording medium as claimed in claim 5, wherein an additive selected from a group of rare earth metals of Tb, Dy, Ho, Er, Tm, Yb and Lu is added to the first magnetic layer of Gd—Co—Ni.

11. Magneto-optic recording medium as claimed in claim 5, wherein a material Gd in Gd—Co—Ni used in the first magnetic layer is replaced with one selected from a group of rare earth metals of Tb, Dy, Ho, Er, Tm, Yb, and Lu.

12. Magneto-optic recording medium as claimed in claim 1, wherein the 1st magnetic layer is selected from a group of Tb—Fe and Tb—Fe—Co, and the 3rd magnetic layer is composed of Dy—Fe—Co, and the 2nd magnetic layer is composed of a material represented by the composition formula, $Gd_x(Fe_{1-y}—Co_y)_{x-y}$ containing at least an additive selected from a group of Bi and Sn, wherein $0.32 \leq x \leq 0.50$, and $0 \leq y \leq 0.3$ ("x" and "y" denote an atom containing ratio, respectively).

* * * * *